(12) United States Patent
Otake et al.

(10) Patent No.: US 10,981,595 B2
(45) Date of Patent: Apr. 20, 2021

(54) ELECTRIC POWER STEERING APPARATUS

(71) Applicant: DENSO CORPORATION, Kariya (JP)

(72) Inventors: Hiroyasu Otake, Kariya (JP);
Toshihiro Fujita, Kariya (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 16/243,488

(22) Filed: Jan. 9, 2019

(65) Prior Publication Data

US 2019/0210637 A1 Jul. 11, 2019

(30) Foreign Application Priority Data

Jan. 11, 2018 (JP) .................................. JP2018-2570

(51) Int. Cl.
*B62D 5/04* (2006.01)
*B62D 15/02* (2006.01)

(52) U.S. Cl.
CPC .......... *B62D 5/049* (2013.01); *B62D 5/0484* (2013.01); *B62D 15/0235* (2013.01)

(58) Field of Classification Search
CPC ... B62D 5/049; B62D 5/0484; B62D 15/0235
See application file for complete search history.

(56) References Cited

U.S. PATENT DOCUMENTS

| 2009/0240389 | A1* | 9/2009 | Nomura | H02P 6/16 |
| | | | | 701/31.4 |
| 2016/0332660 | A1* | 11/2016 | Sasaki | B62D 6/002 |
| 2017/0253269 | A1* | 9/2017 | Kanekawa | G05B 11/42 |
| 2018/0229761 | A1 | 8/2018 | Fujita et al. | |
| 2020/0023887 | A1* | 1/2020 | Sasaki | B62D 5/0463 |

FOREIGN PATENT DOCUMENTS

| JP | 4348848 B2 | 2/2002 |
| JP | 2010-195251 A | 9/2010 |

* cited by examiner

*Primary Examiner* — Aaron L Troost
(74) *Attorney, Agent, or Firm* — Maschoff Brennan

(57) ABSTRACT

A microcomputer includes an abnormality monitor unit, a rotation angle calculation unit and a current supply control unit. The abnormality monitor unit monitors an abnormality of the rotation angle sensor. The rotation angle calculation unit calculates an electrical angle based on angle information acquired from the rotation angle sensor and an abnormality state of the rotation angle sensor. The current supply control unit controls current supply to the winding sets based on the electrical angle. When an abnormality is detected in one of the sensor units, the rotation angle calculation unit calculates the electrical angle based on a hold value which is the electrical angle before the detection of abnormality during a period from the detection of abnormality to a final determination of the abnormality. When the abnormality of the sensor unit is finalized, the electrical angle is calculated based on the angle information of the other sensor unit which is normal.

6 Claims, 15 Drawing Sheets

ELECTRIC POWER STEERING APPARATUS

CROSS REFERENCE TO RELATED APPLICATION

The present application is based on Japanese patent application No. 2018-2570 filed on Jan. 11, 2018, the whole contents of which are incorporated herein by reference.

TECHNICAL FIELD

The present disclosure relates to an electric power steering apparatus.

BACKGROUND ART

A conventional electric power steering apparatus assists a steering force of a steering by a motor. For example, when an abnormality of a torque sensor is detected, a current command value before abnormality detection is held to stabilize a steering operation.

SUMMARY

According to the present disclosure, an electric power steering apparatus is provided for assisting a steering operation in a vehicle by controlling driving of a motor having a winding set. The electric power steering apparatus comprises an inverter for switching over current supply to the winding set, a rotation angle sensor including plural sensor units which detect signals varying with a rotation of the motor and outputting angle information, and a control unit programmed to monitor an abnormality of the rotation angle sensor, calculate a rotation angle of the motor based on the rotation angle information acquired from the rotation angle sensor and an abnormality state of the rotation angle sensor, and control the inverter based on the rotation angle. The control unit is programmed to execute improved calculation of the rotation angle of the motor.

DETAILED DESCRIPTION OF EMBODIMENTS

Figure 1:
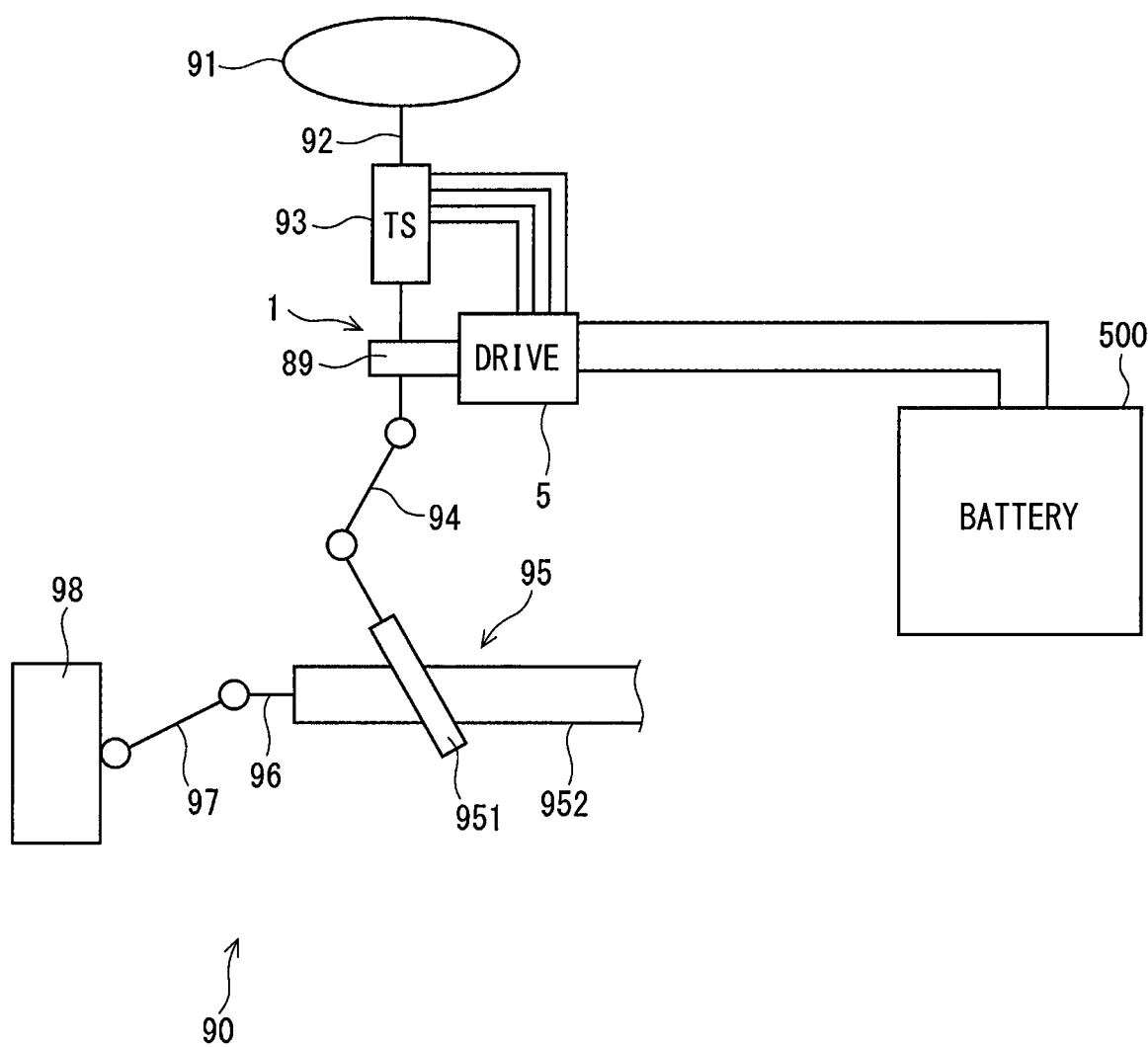
FIG. 1 is a schematic illustration showing a steering system which incorporates an electric power steering apparatus according to a first embodiment.

Hereinafter, an electric power steering apparatus will be described with reference to plural embodiments shown in the accompanying drawings. In the following description, substantially the same configuration is designated with the same reference numerals among the plural embodiments for simplification of description.

First Embodiment

An electric power steering apparatus according to a first embodiment is shown in FIG. 1 to FIG. 8. As shown in FIG. 1, an electric power steering apparatus 1 is incorporated in a steering system 90 of a vehicle. The steering system 90 includes, in addition to the electric power steering apparatus 1, a steering wheel 91 as a steering member, a steering shaft 92, an intermediate shaft 94, a steering device 95, a tie rod 96, a knuckle arm 97, a wheel 98 and the like. The tie rod 96, the knuckle arm 97 and the wheel 98 are provided at both left and right sides of the vehicle.

The steering wheel 91 is connected to the steering shaft 92. The steering shaft 92 is provided with a torque sensor 93 which detects a steering torque. The intermediate shaft 94 is provided between the steering shaft 92 and the steering device 95. The rotational motion of the steering shaft 92 is transmitted via the intermediate shaft 94 and then to the steering device 95.

The steering device 95 has a pinion gear 951 and a rack shaft 952. The rotational motion of the steering shaft 92 transmitted from the intermediate shaft 94 is converted to a reciprocal motion of the rack shaft 952 by the steering device 95. The tie rod 96 is provided at an axial end of the rack shaft 952. The tie rod 96 moves left and right reciprocally with the rack shaft 952 thereby to pull and push the knuckle arm 97 connected to the wheel 98. Thus the wheel 98 is steered to an angle position which corresponds to a displacement amount of the rack shaft 952.

The electric power steering apparatus 1 includes a driving device 5, a reduction gear 89 for transmitting rotation of the driving device 5 by speed reduction, a torque sensor (TS) 93 and the like. That is, the electric power steering apparatus 1 according to the first embodiment is a column-assist type. However, it may be a rack-assist type which transmits the rotation of the motor 80 to the rack shaft 952.

Figure 2:
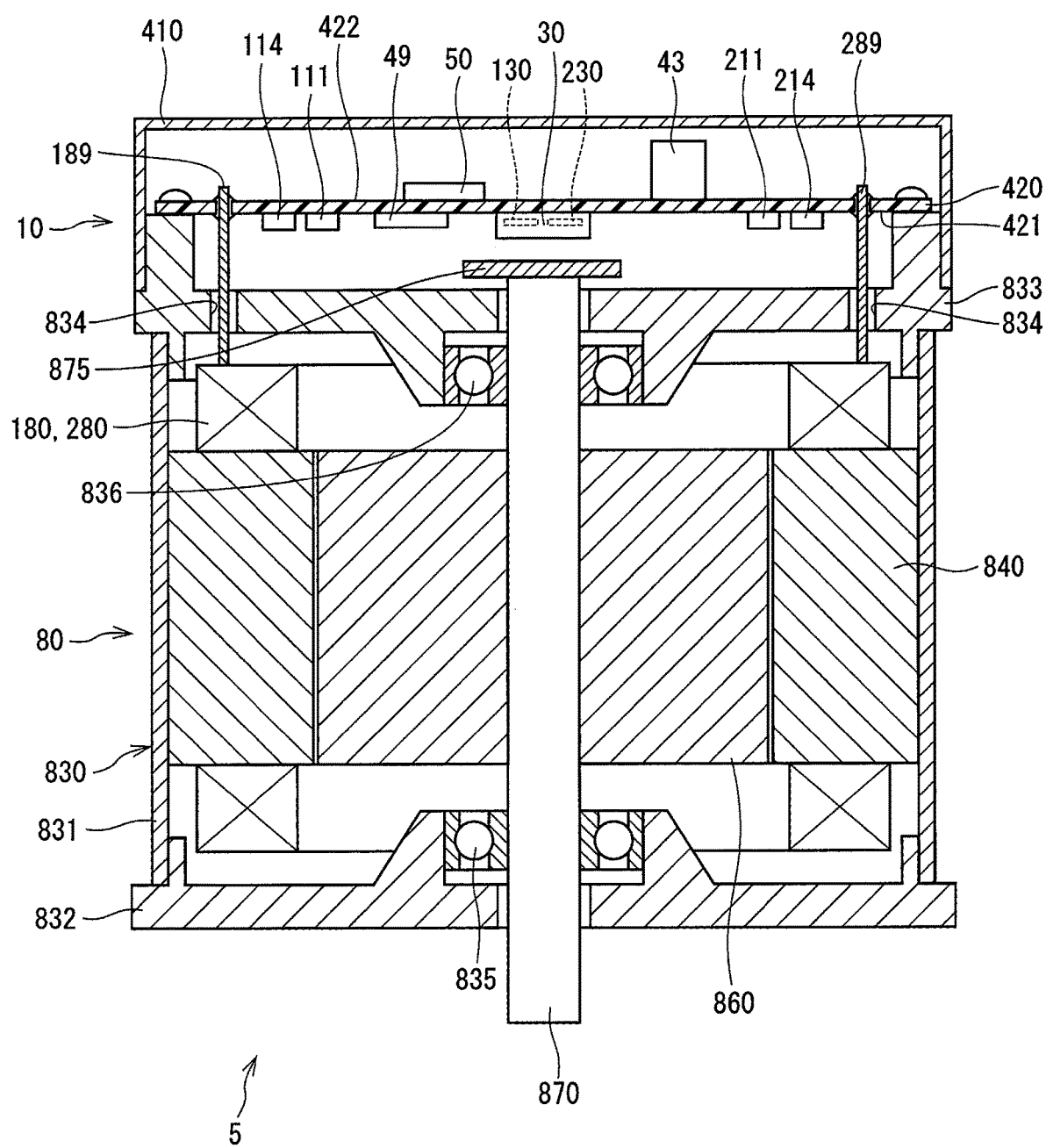
FIG. 2 is a cross-sectional view showing a driving apparatus in the steering system shown in FIG. 1.

As shown in FIG. 2, the driving device 5 includes a motor 80 that is a multi-phase rotating electric machine and a control unit 10 which is integrally provided on one side in an axial direction of the motor 80. Although the driving device 5 in the first embodiment is a machine-integrated type in which the control unit 10 and the motor 80 are integrated in a single unit, the control unit 10 may be a machine-separated type in which the control unit 10 and the motor 80 are separated from each other.

The motor 80 outputs assist torque for assisting the steering operation of the steering wheel 91 by a driver. The motor 80 is driven by electric power supplied from a battery 500 (refer to FIG. 1), which is a direct current power supply, to rotate the reduction gear 89 in forward and reverse directions.

As shown in FIG. 2, the motor 80 is a three-phase brushless motor which includes a first winding set 180, a second winding set 280, a stator 840, a rotor 860, a housing 830 that houses them, and the like. The housing 830 has a cylindrical case 831, a front end frame 832 and a rear end frame 833. The case 831 and the end frames 832 and 833 are fastened to each other by bolts or the like. The front end frame 832 is provided on the axially opposite side to the control unit 10 in the case 831. The rear end frame 833 is provided on the axially same side as the control unit 10 in the case 831.

The stator 840 is fixed to the case 831 and the winding sets 180, 280 are wound thereon. Lead wires 189 and 289 are taken out from the winding sets 180 and 280, respectively. The lead wires 189 and 289 are taken out from insertion holes 834 formed in the rear end frame 833 to the control unit 10 side and connected to the control unit 10. The rotor 860 is provided radially inside the stator 840 to be rotatable relative to the stator 840.

The shaft 870 is fitted firmly in the rotor 860 to rotate integrally with the rotor 860. The shaft 870 is rotatably supported by a housing 830 by bearings 835 and 836. An axial end portion of the shaft 870 on the side of the control unit 10 protrudes from the rear end frame 833 to the control unit 10 side. A magnet 875 is provided at the axial end of the shaft 870 on the control unit 10 side.

The control unit 10 includes a cover 410, a circuit board 420 and various electronic components mounted on the circuit board 420. The cover 410 is fixed to the rear end frame 833 to protect the electronic components from external shocks and to prevent dust and water from entering into the control unit 10. A connector (not shown) is provided on the cover 410.

Figure 3:
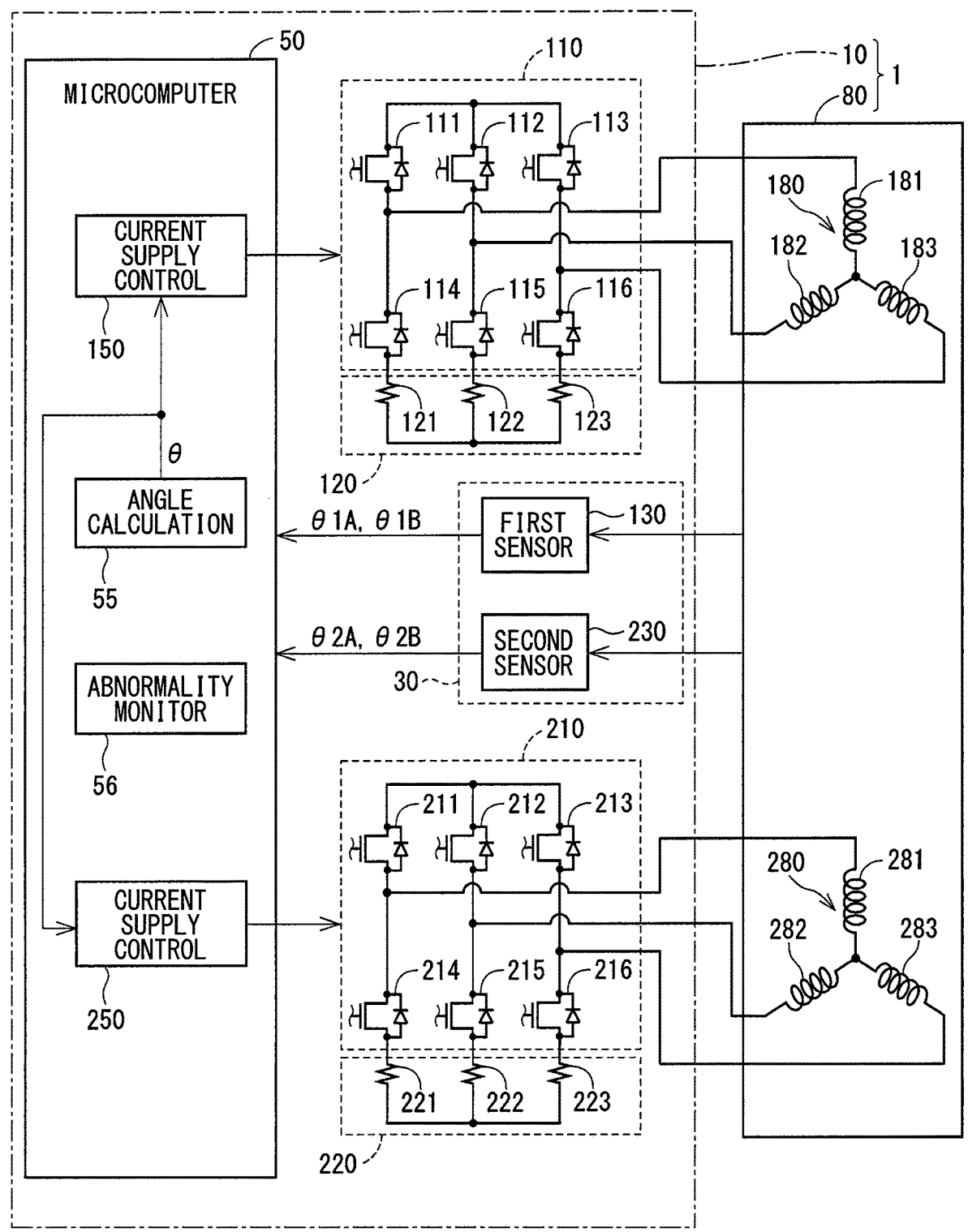
FIG. 3 is a circuit diagram showing the electric power steering apparatus according to the first embodiment.
Figure 5:
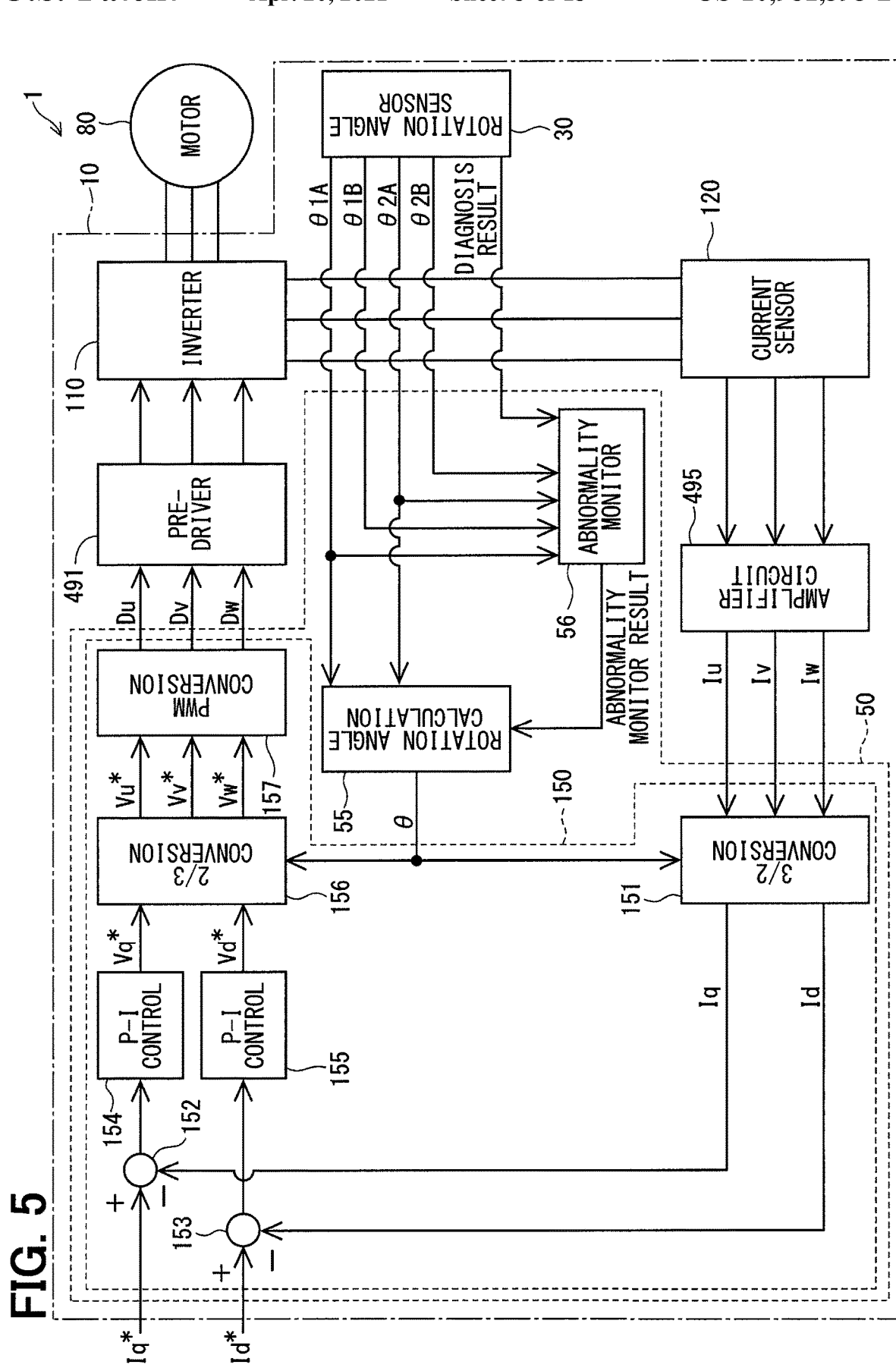
FIG. 5 is a block diagram showing a control unit in the first embodiment.

The circuit board 420 is, for example, a printed circuit board and is fixed to the rear end frame 833. Switching elements 111 to 116, 211 to 216, current detecting sections 120 and 220, a custom IC 49, a rotation angle sensor 30 and the like, which are shown in FIG. 3, are mounted on a motor surface 421, which is a surface of the circuit board 420 on the motor 80 side. The custom IC 49 includes a pre-driver 491 and an amplifier circuit 496 and the like as shown in FIG. 5. A rotation angle sensor 30 is mounted at a position facing the magnet 875.

A microcomputer 50, a capacitor 43 and the like are mounted on a cover surface 422 which is a surface of the circuit board 420 opposite to the motor 80. In the first embodiment, the microcomputer 50 is provided as a control unit.

In the first embodiment, the electronic components are mounted on one circuit board 420 but the electronic components may be mounted on a plurality of circuit boards. In FIG. 2, although the electronic components mounted on the motor surface 421 and the rear end frame 833 are separated from each other, the rear end frame 833 may be formed in a shape capable of dissipating heat of the switching elements 111 to 116, 211 to 216 and the like. Alternatively, a heat sink for dissipating the heat of the switching elements 111 to 116, 211 to 216 and the like may be provided.

As shown in FIG. 3, the first winding set 180 includes a U1 coil 181, a V1 coil 182 and a W1 coil 183, and the second winding set 82 includes a U2 coil 281, a V2 coil 282 and a W2 coil 283.

A first inverter 110 has the switching elements 111 to 116 and converts power to the first winding set 180. Hereinafter, each switching element is referred to as a SW element. The SW elements 111 to 113 are connected to the high-potential side and the SW elements 114 to 116 are connected to the low-potential side. One end of the U1 coil 181 is connected to a connection point between the pair of the U-phase switching elements 111 and 114. One end of the V1 coil 182 is connected to a connection point between the pair of the V-phase switching elements 112 and 115. One end of the W1 coil 183 is connected to a connection point between the pair of the W-phase switching elements 113 and 116. The other ends of the coils 181 to 183 are connected to one another.

A second inverter 210 has switching elements 211 to 216 and converts power to the second winding set 280. The SW elements 211 to 213 are connected to the high-potential side and the SW elements 214 to 216 are connected to the low-potential side. One end of the U2 coil 281 is connected to a connection point between the pair of the U-phase switching elements 211 and 214. One end of the V2 coil 282 is connected to a connection point between the pair of the V-phase switching elements 212 and 215. One end of the W2 coil 283 is connected to a connection point between the pair of the W-phase SW elements 213 and 216. The other ends of the coils 181 to 183 are connected to one another. The SW elements 11 to 16 and 211 to 216 of the first embodiment are MOSFETs, but they may be IGBTs, thyristors or the like.

A first current detection unit 120 is provided as a current sensor on the low-potential side of the first inverter 110. The first current detection unit 120 includes a U1 current detection element 121 for detecting a current flowing through the U1 coil 181, a V1 current detection element 122 for detecting a current flowing through the V1 coil 182 and a W1 current detection element 123 for detecting a current flowing through the W1 coil 183.

A second current detection unit 220 is provided as a current sensor on the low-potential side of the second inverter 210. The second current detection unit 220 includes a U2 current detection element 221 for detecting a current flowing through the U2 coil 281, a V2 current detection element 122 for detecting a current flowing through the V2 coil 282 and a W2 current detection element 223 for detecting a current flowing through the W2 coil 283. The current detection elements 121 to 123 and 221 to 223 of the first embodiment are shunt resistors but may be Hall elements or the like. In addition, the current detection units 120 and 220 may be provided at any position where the currents can be detected. Detection values of the current detection units 120 and 220 are outputted to a three-phase to two-phase (3/2) conversion unit 521 of the microcomputer 50 via an amplifier circuit 495 as shown in FIG. 5.

Hereinafter, the combination of the configurations of the first winding set 180 and the first inverter 110 and the like provided in correspondence to the first winding set 180 will be referred to as a first system. Further, the combination of the configurations of the second winding set 280 and the second inverter 210 and the like provided in correspondence to the second winding set 280 will be referred to as a second system.

Figure 4:
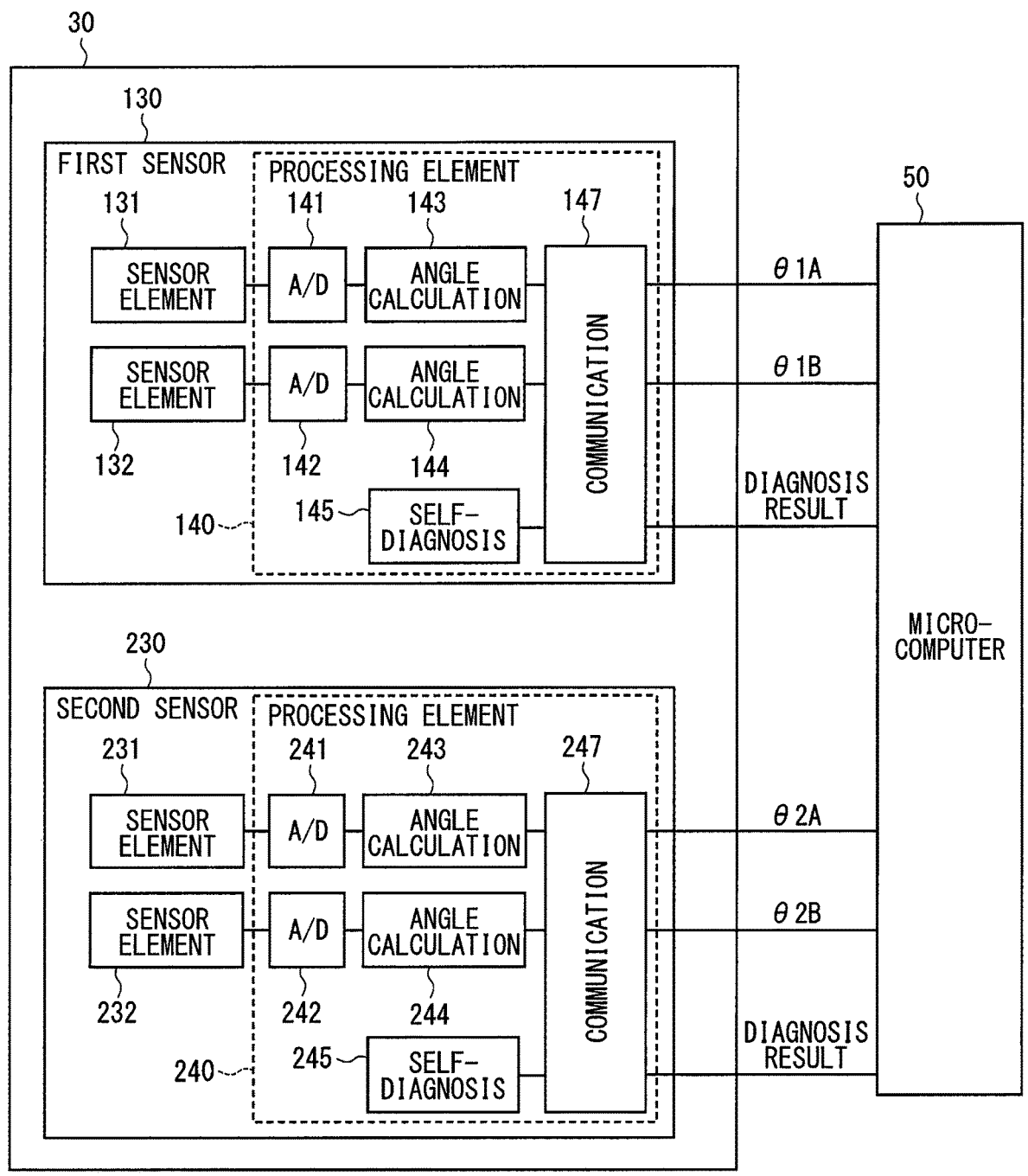
FIG. 4 is a block diagram showing a rotation angle sensor in the first embodiment.

As shown in FIG. 4, the rotation angle sensor 30 includes a first sensor unit 130 and a second sensor unit 230. In FIG. 2, the first sensor unit 130 and the second sensor unit 230 are shown as being provided in one package but may be separately provided separately.

The first sensor unit 130 includes sensor elements 131, 132, a processing element 140 and the like. The sensor elements 131 and 132 are magnetic detection elements that detect changes in the magnetic field caused by the rotation of the magnet 875 which rotates integrally with the shaft 870. The sensor elements 131 and 232 are, for example, MR elements such as GMR, AMR, and TMR, Hall elements or the like. For example, the first sensor unit 130 and the second sensor unit 230 are positioned to detect the same rotation angle of the motor 80. The sensor elements 131 and 132 output analog signals in a sine waveform and a cosine waveform varying with the rotation of the motor 80, respectively. The sensor elements 231 and 232 similarly output analog signals in a sine waveform and a cosine waveform varying with the rotation of the motor 80, respectively.

The processing element 140 includes A/D conversion units 141, 142, angle information calculation units 143, a self-diagnosis unit 145, a communication unit 147 and the like. The A/D conversion unit 141 digitally converts, that is, A/D-converts, an amplitude of the analog signal of the sensor element 131 to a digital detection value and outputs the digital detection value to the angle information calculation unit 143. Based on the digital detection value of the A/D conversion unit 141 indicating a detection value of the sensor element 131, the angle information calculation unit 143 calculates angle information θ1A which is information indicating a rotational position of the motor 80. The A/D conversion unit 142 digitally converts an amplitude of the analog signal of the sensor element 132 to a digital detection value and outputs the digital detection value to the angle information calculation unit 144. Based on the digital detection value of the A/D conversion unit 142 indicating a detection value of the sensor element 132, the angle information calculation unit 144 calculates angle information θ1B which is information indicating the rotational position of the motor 80. The angle information θ1A and θ1B varies as a sine function ($\sin \theta$) and a cosine function ($\cos \theta$).

The self-diagnosis unit 145 monitors an abnormality such as a fault at the high-potential side and at the low-potential side or the like in the first sensor unit 130. The communication unit 147 outputs the angle information θ1A, θ1B and the self-diagnosis result to the microcomputer 50 as digital signals.

The second sensor unit 230 also includes sensor elements 231, 232, a processing element 240 and the like. The processing element 240 includes A/D conversion units 241, 242, angle information calculation units 243, 244, a self-diagnosis unit 245, a communication unit 247 and the like. The communication unit 147 outputs angle information θ2A and θ2B and a self-diagnosis result to the microcomputer 50 as digital signals. The structural elements of the second sensor unit 230 are the same as the structural elements of the first sensor unit 130 in which the last two digits of the reference numerals are the same and hence detailed description thereof will be omitted. In the first embodiment, calculations in the sensor elements 131, 132, 231, 232 and in the angle information calculation units 143, 144, 243, 244 are the same, but accuracy and the like of detection and calculation may be different. Hereinafter, it is assumed that each angle information θ1A, θ1B, θ2A, θ2B is a value corresponding to the electrical angle.

As shown in FIG. 2 and FIG. 5, the microcomputer 50 is configured to include current supply control units 150, 250, a rotation angle calculation unit 55, an abnormality monitor unit 56 and the like. The microcomputer 50 performs each of these operations of functional units by execution of programmed processing. The first current supply control unit 150 controls current supply to the first winding set 180 and the second current supply control unit 250 controls current supply to the second winding set 280. Since details of the current supply control in the first system and the current supply control in the second system are similar, the first system will be described in detail with reference to FIG. 5 while omitting description of the second inverter 210, the second current detection unit 220, the second current supply control unit 250 and the like. Similarly only the first system will be described with reference to FIG. 13.

The current supply control unit 150 includes a three-phase to two-phase (3/2) conversion unit 151, subtractors 152, 153, PI (proportional and integral) control units 154, 155, two-phase to three-phase (2/3) conversion unit 156, a PWM conversion unit 157 and the like. The three-phase to two-phase conversion unit 151 dq-converts three-phase current detection values Iu, Iv and Iw based on an electrical angle θ, and calculates a q-axis current detection value Iq and a d-axis current detection value Id.

The subtractor 152 calculates a q-axis current deviation ΔIq which is a deviation between a q-axis current command value ΔIq* and a q-axis current detection value Iq. The subtractor 152 further calculates a d-axis current deviation ΔId which is a deviation between a d-axis current command value Id* and a d-axis current detection value Id.

The PI control unit 154 calculates a q-axis voltage command value Vq* by PI calculation or the like so that the q-axis current deviation ΔIq decreases and converges to 0. The PI control unit 155 also calculates a d-axis voltage command value Vd* by PI calculation or the like so that the d-axis current deviation ΔId decreases and converges to 0.

The two-phase to three-phase converter 156 dq-converts the q-axis voltage command value Vq* and the d-axis voltage command value Vd* inversely based on the electrical angle θ and converts the three-phase voltage command values Vu*, Vv*, Vw*. The PWM conversion unit 157 calculates duty command values Du, Dv, Dw, for example, by triangular wave comparison or the like based on the three-phase voltage command values Vu*, Vv*, Vw*, and outputs them to the pre-driver 491. The pre-driver 491 generates drive signals based on the duty command values Du, Dv, Dw, and outputs the drive signals to the first inverter 110. Driving of the motor 80 is controlled by controlling the first inverter 110 based on the drive signals.

The rotation angle calculation unit 55 calculates the electrical angle θ based on the angle information acquired from the rotation angle sensor 30. In the first embodiment, the angle information θ1A acquired from the first sensor unit 130 and the angle information θ2A acquired from the second sensor unit 230 are used. However, the angle information θ1B and θ2B may be used alternatively. In the first embodiment, assuming that the first sensor unit 130 is a main sensor unit and the second sensor unit 230 is an auxiliary sensor unit, the angle information θ1A is used for the calculation of the electrical angle θ as far as the first sensor unit 130 is normal.

The abnormality monitor unit 56 performs abnormality check processing based on the angle information θ1A, θ1B, θ2A, θ2B acquired from the rotation angle sensor 30 and the self-diagnosis result. The abnormality check result is outputted to the rotation angle calculation unit 55. In the rotation angle calculation unit 55, an angle calculation is performed in correspondence to an abnormal situation of the rotation angle sensor 30.

Abnormality check processing in the abnormality monitor unit 56 will be described with reference to a flowchart of FIG. 6. Since the abnormality check processing for the sensor units 130 and 230 are similar, the check processing for the first sensor 130 will be described as an example. Hereinafter, "step" in flowcharts is simply referred to as a symbol "S." The abnormality check processing and angle calculation processing described hereinafter are one examples and other methods may be used.

Figure 6:
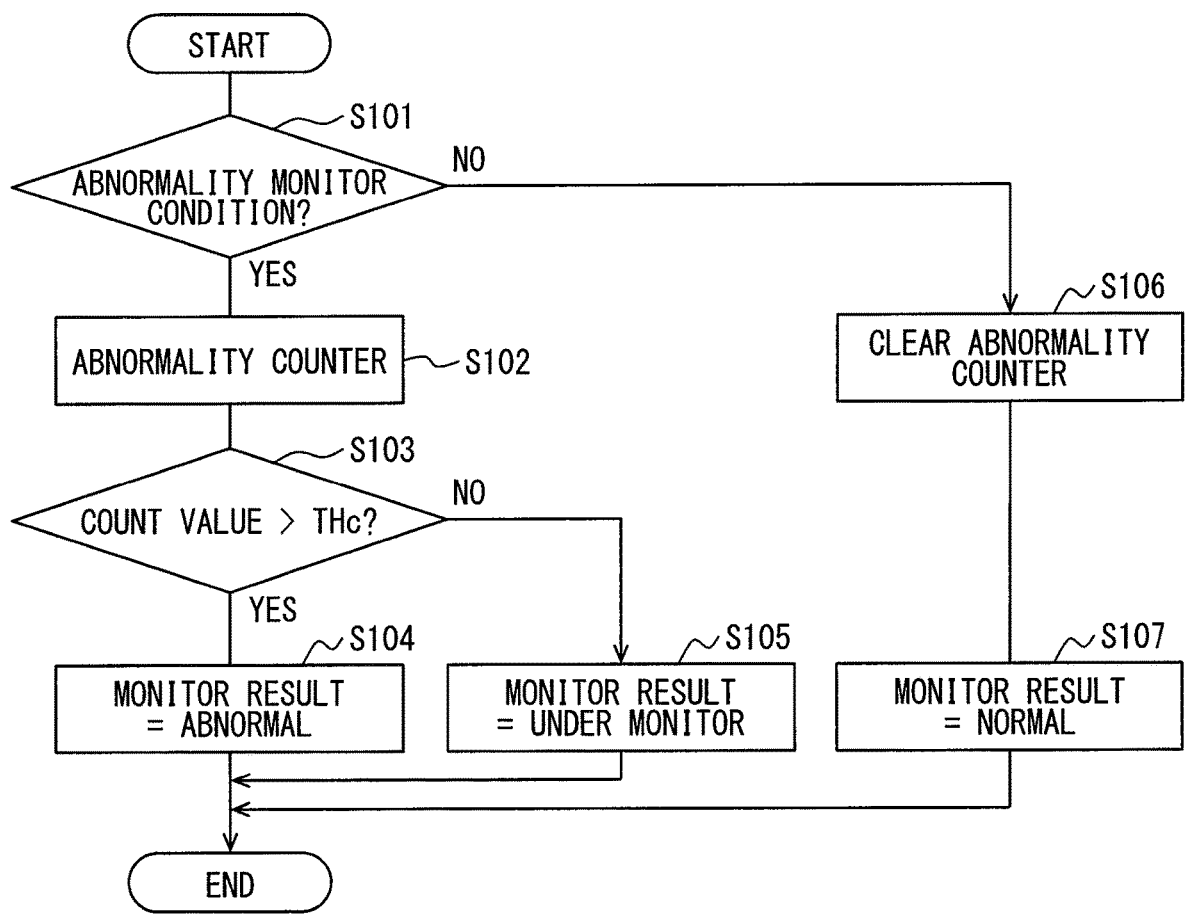
FIG. 6 is a flowchart showing abnormality check processing executed in the first embodiment.

Referring to FIG. 6, in S101, the abnormality monitor unit 56 checks whether the abnormality monitor condition for the first sensor unit 130 is satisfied. In the first embodiment, when the deviation between the angle information θ1A and θ1B is larger than an abnormality determination threshold value THe1, that is, when |θ1A−θ1B|>The1, or when the self-diagnosis result acquired from the first sensor unit 130 indicates abnormality of the first sensor unit 130, the abnormality monitor unit 56 determines that the abnormality monitor condition is satisfied. The abnormality determination threshold value THe1 is set to an arbitrary value close to zero in consideration of a detection error or the like. When it is determined that the abnormality monitor condition is not satisfied (S101: NO), the abnormality monitor unit 56 executes S106. When it is determined that the abnormality monitor condition is satisfied (S101: YES), the abnormality monitor unit 56 executes S102. In this S102, an abnormality counter provided for checking continuation of the abnormality detection about the first sensor unit 130 is incremented.

In S103, the abnormality monitor unit 56 checks whether a count value of the abnormality counter is larger than an abnormality determination finalization threshold value THc. The abnormality determination finalization threshold value THc is set to an arbitrary count value for finalizing the abnormality after detection of the abnormality. When it is determined that the count value of the abnormality counter is larger than the abnormality determination finalization threshold value THc (S103: YES), the abnormality monitor unit 56 executes S104 and finalizes the abnormality determination result, which indicates the continuation of abnormality. When it is determined that the count value of the abnormality counter is equal to or smaller than the abnormality determination finalization threshold value THc (S103: NO), the abnormality monitor unit 56 executes S105 and determines that the first sensor unit is detected as being abnormal but need be monitored more before finally determined to abnormal. That is, in S105, the first sensor unit 130 is put under a continued monitor state because the first sensor unit 130 may be temporarily abnormal, that is, only potentially abnormal, because of noise or the like.

When it is determined that the abnormality monitor condition is not satisfied (S101: NO), the abnormality monitor unit 56 clears the abnormality counter in S106. In S107, the abnormality monitor unit 56 determines that the abnormality check result indicates no abnormality, that is, the first sensor unit 130 is normal.

The angle calculation processing in the rotation angle calculation unit 55 will be described with reference to the flowchart of FIG. 7. In S501, the rotation angle calculation unit 55 checks whether the first sensor unit 130 is normal. When it is determined that the first sensor unit 130 is not normal (S501: NO), that is, when the first sensor unit 130 is still under monitor state or finally determined to be abnormal, the rotation angle calculation unit 55 executes S505. When it is determined that the first sensor unit 130 is normal (S501: YES), the rotation angle calculation unit 55 executes S502.

In S502, the rotation angle calculation unit 55 checks whether the second sensor unit 230 is normal. When it is determined that the second sensor unit 230 is normal (S502: YES), the rotation angle calculation unit 55 executes S504. When it is determined that the second sensor unit 230 is not normal (S502: NO), the rotation angle calculation unit 55 executes S503.

In S503, the rotation angle calculation unit 55 checks whether the second sensor unit 230 is finally determined to be abnormal. When it is determined that the second sensor unit 130 is not finalized to be abnormal (S503: NO), that is, when the second sensor unit 130 is determined to be under the monitor state and before final determination of abnormality, the rotation angle calculation unit 55 executes S510. When it is determined that the second sensor unit 130 is finally determined to be abnormal (S503: YES), the rotation angle calculation unit 55 executes S504.

In S504, the rotation angle calculation unit 55 calculates the electrical angle θ, which is used for current supply control, based on the first angle information θ1A. In the first embodiment, since the first angle information θ1A is a value corresponding to the electrical angle, the electrical angle is set as θ=θ1A. Also, the calculated electrical angle θ is held as a hold value θhold.

In S505, which is executed when it is determined that the first sensor unit 130 is not normal (S501: NO), the rotation angle calculation unit 55 further checks whether the abnormality of the first sensor unit 130 is finalized. When it is determined that the abnormality of the first sensor unit 130 is not finalized (S505: NO), that is, when the first sensor unit 130 is still under the monitor state before the final determination of abnormality, the rotation angle calculation unit 55 executes S510. When it is determined that the abnormality of the first sensor unit 130 is finalized (S505: YES), the rotation angle calculation unit 55 executes S506.

In S506, the rotation angle calculation unit 55 checks whether the second sensor unit 230 is normal similarly to checking in S502. When it is determined that the second sensor unit 130 is normal (S506: YES), the rotation angle calculation unit 55 executes S508. When it is determined that the second sensor unit 230 is not normal (S506: NO), the rotation angle calculation unit 55 executes S507.

In S507, the rotation angle calculation unit 55 checks whether the second sensor unit 230 is finally determined to be abnormal similarly to checking in S503. When it is determined that the abnormality of the second sensor unit 230 is finalized (S507: YES), the rotation angle calculation unit 55 executes S509. When it is determined that the abnormality of the second sensor unit 230 has not been finalized yet (S505: NO), that is, when the second sensor unit 230 is only potentially abnormal and still need be monitored before the final determination of abnormality, the rotation angle calculation unit 55 executes S510.

In S508, the rotation angle calculation unit 55 calculates the electrical angle θ, which is used for current supply control, based on the second angle information θ2A. In the first embodiment, since the second angle information θ2A is a value corresponding to the electrical angle, the electrical angle is set as θ=θ2A. Also, the calculated electrical angle θ is held as the hold value θhold.

In S509, the rotation angle calculation unit 55 sets the electrical angle θ to the hold value θhold. In addition, the microcomputer 50 stops driving the motor 80 and stops assisting the steering operation.

In S510 which is executed when the first sensor unit 130 or the second sensor unit 230 is potentially abnormal and still under the monitor state, the rotation angle calculation unit 55 sets the electrical angle θ0 used for the current supply control to the hold value θhold. In the first embodiment, during the continued monitoring about the abnormality of the first sensor unit 130 (S501: NO and S502: NO), the hold value θhold is used as the electrical angle θ regardless of a state of the second sensor unit 230.

Figure 7:
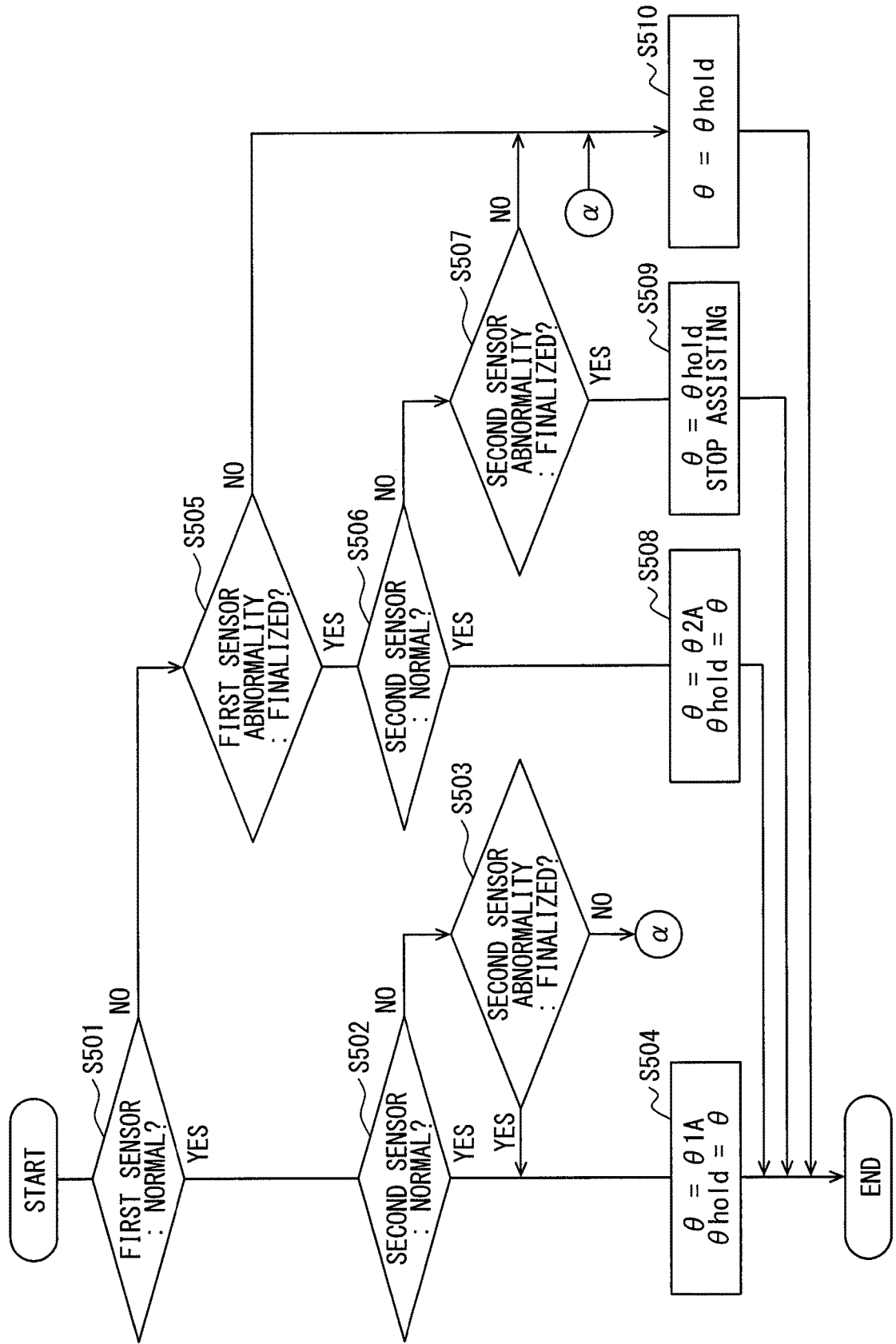
FIG. 7 is a flowchart showing angle calculation processing executed in the first embodiment.

In case that the first sensor unit 130 is normal, it is possible to calculate the electrical angle θ based on the angle information θ1A of the first sensor unit 130 regardless of the state of the second sensor unit 230 without processing of S502 and S503 in FIG. 7. That is, even when the abnormality of the second sensor unit 230 which is the auxiliary sensor unit is detected, the electrical angle θ may be calculated continuously by using the angle information of the first sensor unit 130 which is the main sensor unit. Similarly in the following embodiments, the calculation of the electrical angle θ may be continued by using the angle information of the main sensor unit when an abnormality occurs in the auxiliary sensor unit.

Figure 8:
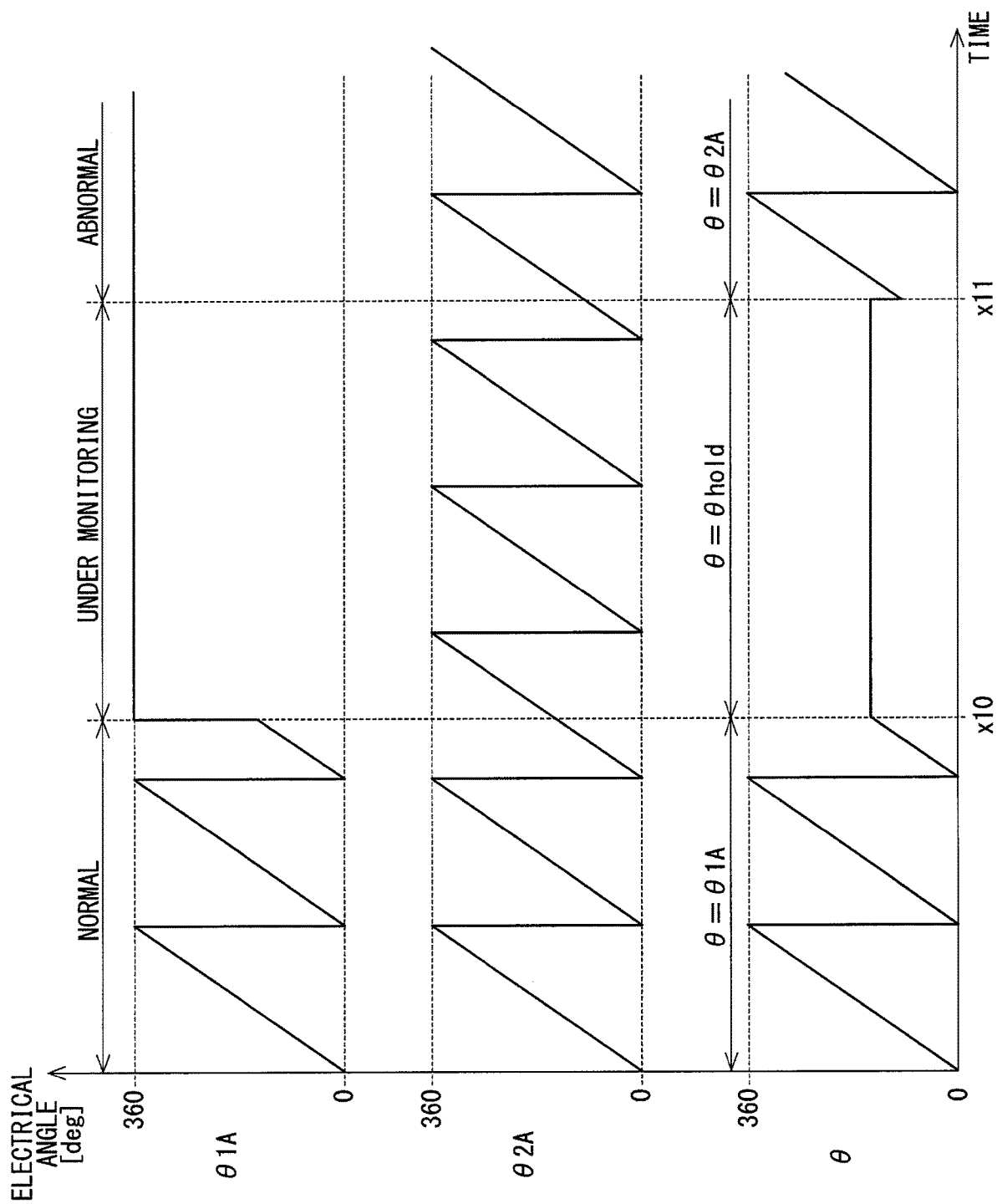
FIG. 8 is a time chart showing an electrical angle change in the first embodiment.
Figure 9:
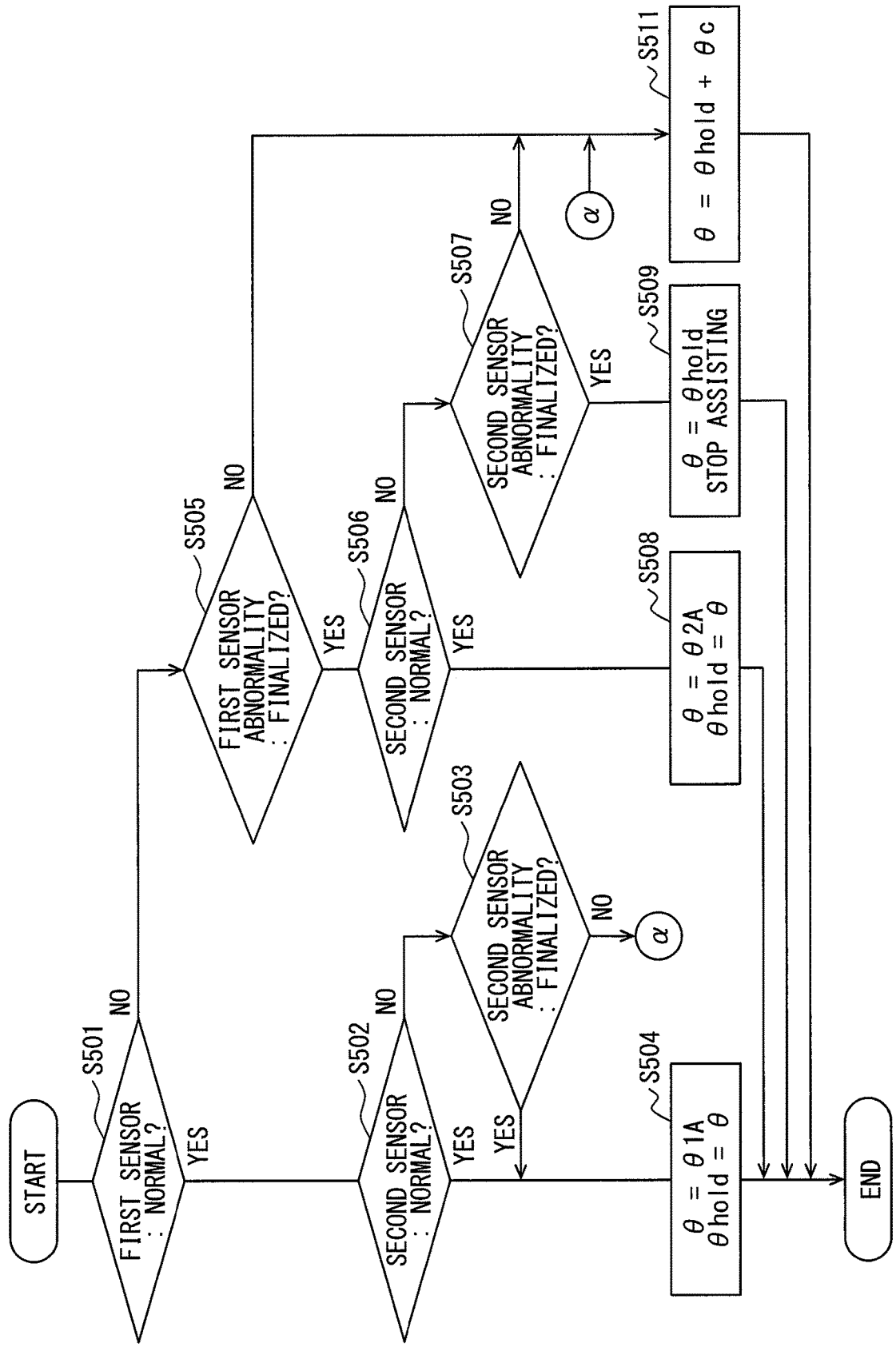
FIG. 9 is a flowchart showing angle calculation processing executed in a second embodiment.
Figure 10:
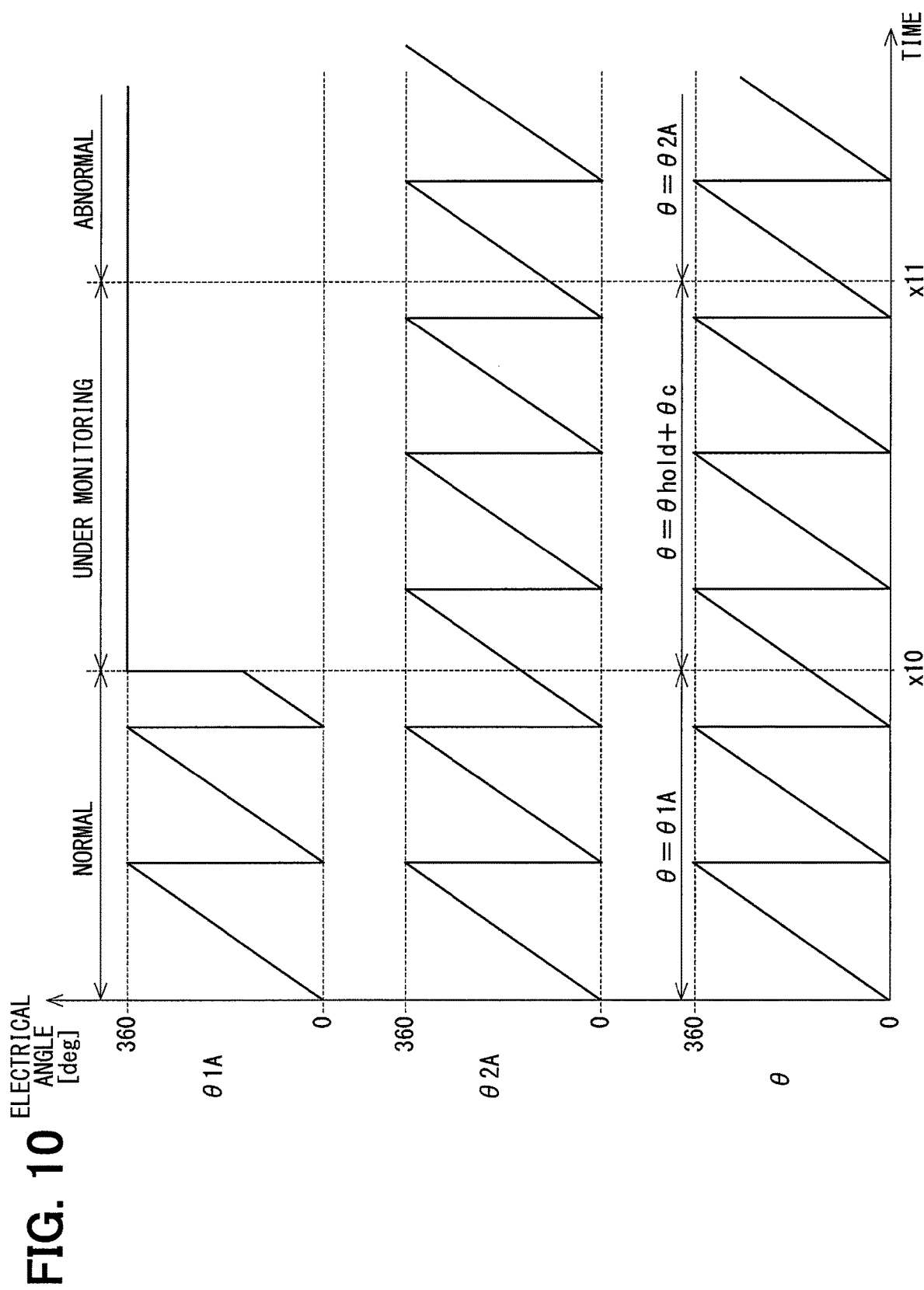
FIG. 10 is a time chart showing an electrical angle change in the second embodiment.

The electrical angle θ used for the current supply control will be described with reference to a time chart of FIG. 8. In FIG. 8, the horizontal axis is a common time axis, the first angle information θ1A, the second angle information θ2A and the electrical angle θ used for current supply control are shown in sequence from the top to the bottom. FIG. 9 and FIG. 10 also show time charts similarly.

As shown in FIG. 8, during a period till time x10 at which the abnormality is detected, the abnormality check result indicates no abnormality and the angle information θ1A and θ1B coincide if no error is assumed. In the first embodiment, when the first angle information θ1A is normal, the electrical angle θ is calculated based on the first angle information θ1A.

When the abnormality of the first sensor unit 130 is detected at time x10, the abnormality check result continues to indicate the detection of abnormality during a period of monitor state up to time x11 at which the abnormality is finalized, and the electric angle θ is set to the hold value θhold. In FIG. 8, although it is assumed that the second angle information θ2A is normal during the period from time x10 to time x11 during which the abnormality is being monitored before the finalization of abnormality. In case that the abnormality check result about the first angle information θ1A is still under the continuous monitor state, the electrical angle θ is set to the hold value θhold regardless of the abnormal or normal state of the second angle information θ2A.

When the detection of abnormality of the first sensor unit 130 continues until time x11, the abnormality of the first sensor unit 130 is finalized and the electrical angle θ is calculated based on the second angle information θ2A thereafter. During the period of monitoring the abnormality before the abnormality is finalized, that is, the continued monitor period from time x10 to time x11, the electric angle θ is calculated using the hold value θhold which is the angle information calculated before the finalization of the abnormality. When the abnormality determination is finalized, the calculation of the electrical angle θ is switched to the calculation which uses the normal angle information calculated before the first sensor unit 130 is detected as being abnormal first time. It is thus possible to reduce a steering shock and discomfort which will be caused when the abnormality occurs particularly in case that the steering wheel is in the neutral position or held in the course of steering operation.

As described above, the electric power steering apparatus 1 of the first embodiment assists the steering operation of the driver of the vehicle by controlling the driving of the motor 80 having the winding sets 180, 280, and includes the inverters 110, 210, the rotation angle sensor 30 and the microcomputer 50. The inverters 110 and 210 switch over the current supply to the winding sets 180 and 280. The rotation angle sensor 30 has plural sensor units 130 and 230. The sensor units 130 and 230 detect signals that vary with the rotation of the motor 80 and output angle information.

The microcomputer 50 includes the rotation angle calculation unit 55, the abnormality monitor unit 56 and the current supply control units 150, 250. The abnormality monitor unit 56 monitors abnormality of the rotation angle sensor 30. The rotation angle calculation unit 55 calculates the electrical angle θ as the rotation angle of the motor 80 based on the angle information θ1A and θ2A acquired from the rotation angle sensor 30 and the abnormality state of the rotation angle sensor 30. The current supply control units 150 and 250 control the inverters 110 and 210, respectively, based on the electrical angle θ.

When an abnormality is detected in any one of the sensor units 130 and 230, the rotation angle calculation unit 55 calculates the electrical angle θ based on the hold value θhold which is the electrical angle θ before the abnormality detection during the monitor period from the abnormality detection until the final determination of the abnormality. When the abnormality of the sensor unit 130 or 230 is finalized, the electric angle θ is calculated based on the angle information of the other sensor unit which is normal. The rotation angle calculation unit 55 may calculate a mechanical angle as the rotation angle instead of the electrical angle θ.

For example, when the torque sensor 93 is abnormal, the steering shock which arises at the time of detecting a torque sensor abnormality can be reduced by holding the current command values Id* and Iq*. However, even when the current command values Id* and Iq* are held at the time of abnormality of the rotation angle sensor 30, there still remains a possibility that the steering shock cannot be reduced. Therefore, in the first embodiment, during the abnormality detection of the rotation angle sensor 30, the electrical angle θ is calculated based on the hold value θhold which is the electrical angle θ before the abnormality detection. In the first embodiment, during the abnormality detection before the finalization of rotation sensor abnormality, the hold value θhold itself is set as the electrical angle θ. Thereby, even when the abnormality occurs in the rotation angle sensor 30, it is possible to appropriately control the motor 80. It is also possible to reduce the steering shock in the case where the abnormality occurs in the neutral position or the steering wheel holding position of the steering wheel 91.

The rotation angle sensor 30 includes the first sensor unit 130 which is the main sensor unit and the second sensor unit 230 which is the auxiliary sensor unit. When the first sensor unit 130 is normal, the rotation angle calculation unit 55 calculates the electrical angle θ based on the angle information θ1A of the first sensor unit 130. The rotation angle calculation unit 55 calculates the electrical angle θ based on the hold value θhold from when the abnormality of the first sensor unit 130 is detected first time until the abnormality is finally determined after continuation of the abnormality. When the abnormality of the first sensor unit 130 is finalized, the angle information to be used to calculation of the electrical angle θ is switched to the angle information θ2A of the second sensor unit 230. It is thus possible to properly calculate the electrical angle θ at the time of abnormality of the first sensor unit 130.

During the period from the abnormality detection to the final determination of the abnormality of the second sensor unit 230, the rotation angle calculation unit 55 calculates the electrical θ based on the hold value θhold. When the abnormality of the second sensor unit 230 is finalized after the continuation of the detection of abnormality, the electric angle θ is calculated based on the angle information θ1A of the first sensor unit 130 again. In addition, when the abnormality of the second sensor unit 230 is detected, the rotation angle calculation unit 55 may continue the calculation of the electrical angle θ based on the angle information of the first sensor unit 130. It is thus possible to properly calculate the electrical angle θ at the time of abnormality of the first sensor unit 130.

Second Embodiment

Figure 11:
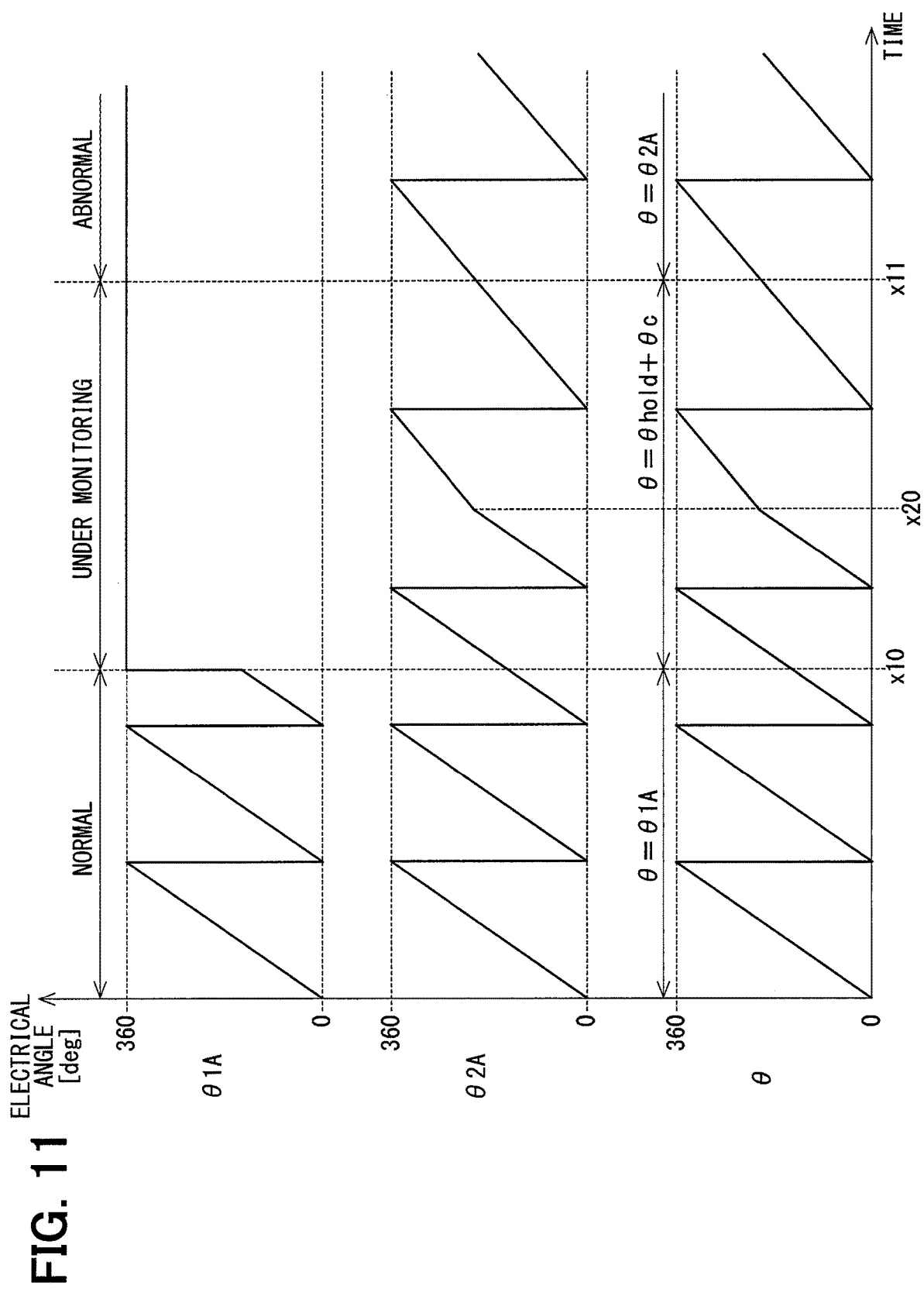
FIG. 11 is a time chart showing another electrical angle change in the second embodiment.

A second embodiment is shown in FIG. 9 to FIG. 11. As shown in FIG. 9, angle calculation processing of the second embodiment is different in that S511 is executed in place of S510. In S511 which is executed when the check result in S503 or S505 is negative (NO), the rotation angle calculation unit 55 sets the electrical angle θ used for the current supply control by correcting the hold value θhold by a correction value θc. The electrical angle θ is expressed as the following equation (1) and the correction value θc is expressed as the following equation (2). In the equation, "ω" is a rotation angular velocity calculated from the angle information and "t" is time elapsing from the detection of abnormality. Further, when it is impossible to calculate the correction value θc because the sensor units 130 and 230 are both detected as being abnormal, for example, the correction value may be set to θc=0 and the hold value θhold itself may be set as the electrical angle θ.

$$\theta = \theta hold + \theta c \quad (1)$$

$$\theta c = \omega \times t \quad (2)$$

FIG. 10 shows an example in a case where the rotation angular velocity ω during the abnormality detection is constant. FIG. 11 shows an example in a case where the rotation angular velocity ω changes during the abnormality detection, that is, under the monitor state. As shown in FIG. 10 and FIG. 11, by setting the electrical angle θ to the value which is determined by correcting the hold value θhold with the correction value θc during the abnormality detection, it is possible to calculate the electrical angle θ more properly. Further, even in case that there are offset errors in the angle information θ1A and θ1B, the rotation angular velocity ω can be calculated to the same value. As a result, the electrical angle θ is made to be continuous and hence it is possible to reduce the steering shock and discomfort to the driver which are caused by the discontinuity of the electrical angle θ. In particular, as shown in FIG. 11, even when the rotation angular velocity ω changes at time x20 during the abnormality detection which is the period from time x10 to time x20, the electrical angle θ can be accurately estimated. As a result, it is possible to reduce furthermore the steering shock and the discomfort to the driver which are caused when the angular information used for calculating the electrical angle θ is switched over.

In the second embodiment, during the period from the abnormality detection of the sensor unit 130 or 230 to the final determination of the abnormality, the rotation angle calculation unit 55 sets the electrical angle θ to be the value, which is calculated by correcting the hold value θhold by using the rotation angular velocity ω calculated based on the angle information of the sensor unit which is normal. Thereby, even when the steering speed changes during the abnormality detection, the electrical angle θ can be accurately estimated and the steering shock and discomfort to the driver can be further reduced.

Third Embodiment

Figure 12:
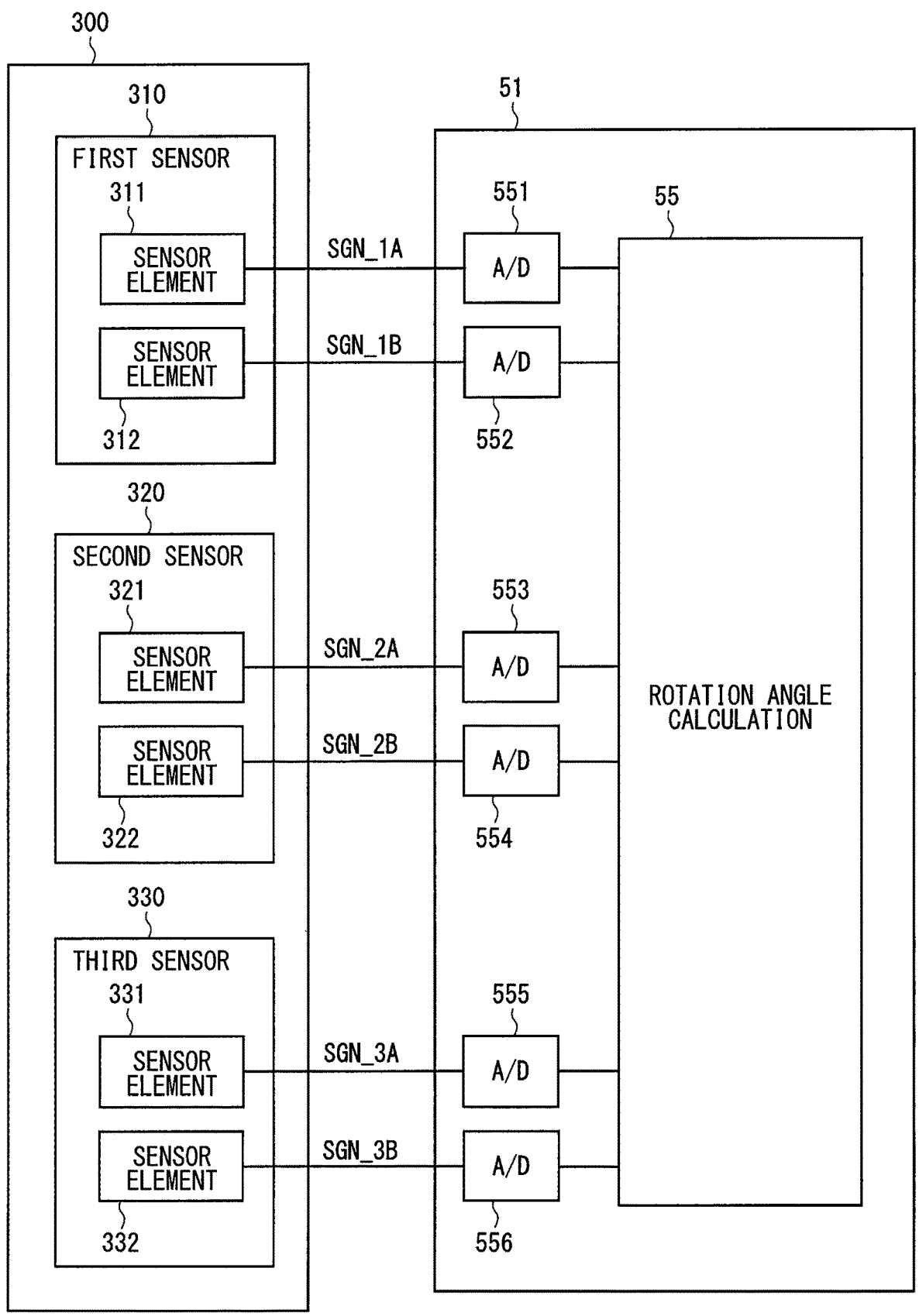
FIG. 12 is a block diagram showing a rotation angle sensor in a third embodiment.
Figure 13:
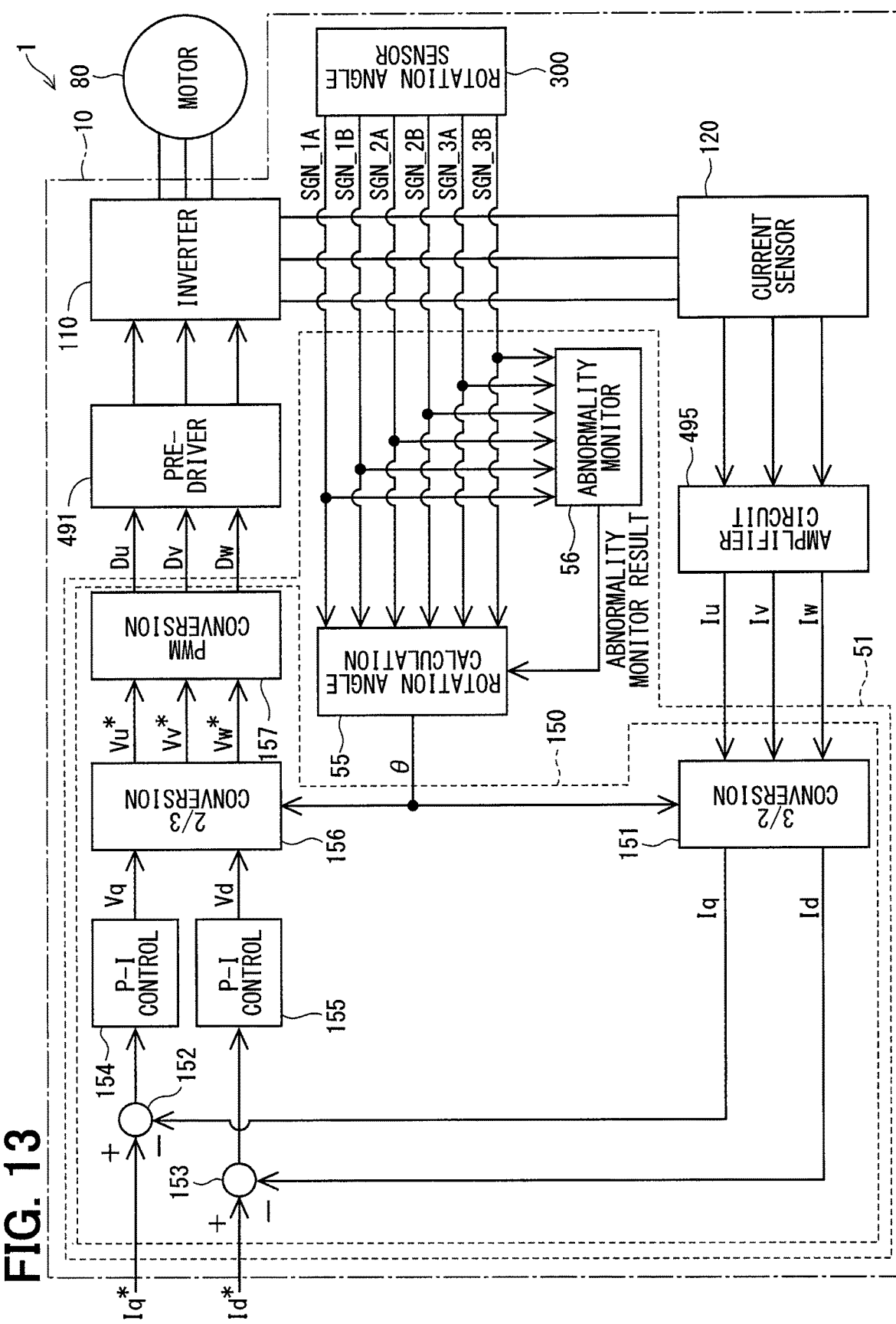
FIG. 13 is a block diagram showing a control unit in the third embodiment.
Figure 14:
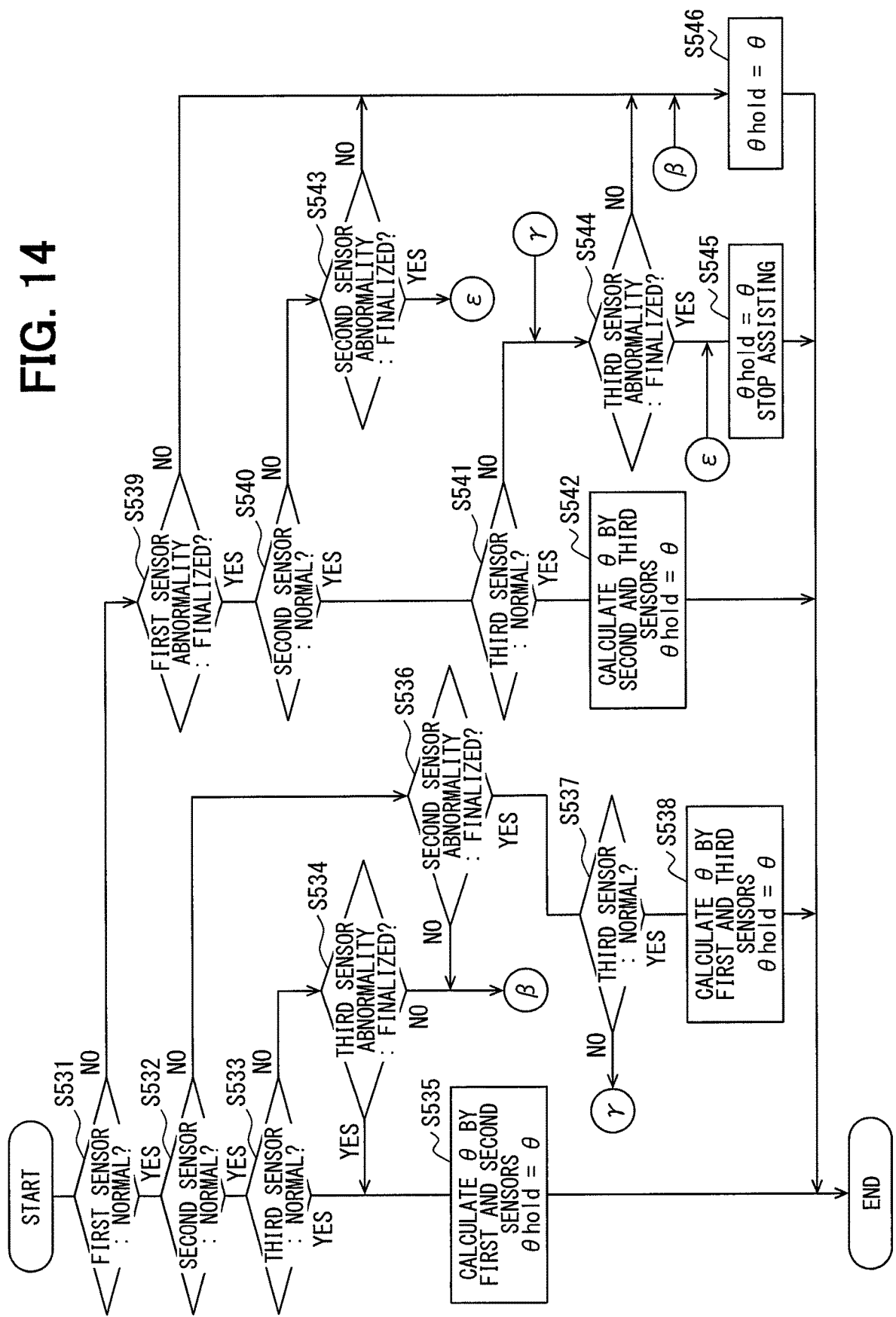
FIG. 14 is a flowchart showing angle calculation processing executed in the third embodiment.

A third embodiment is shown in FIG. 12 to FIG. 14. In the third embodiment, as shown in FIG. 12, a rotation angle sensor 300 is connected to a microcomputer 51, which is provided as a control unit. The rotation angle sensor 300 includes a first sensor unit 310, a second sensor unit 320 and a third sensor unit 330.

The first sensor unit 310 includes sensor elements 311 and 312. The sensor element 311 outputs angle information SGN_1A which is a sine signal to a microcomputer 51. The sensor element 312 outputs angle information SGN_1B which is a cosine signal to the microcomputer 51. The second sensor unit 320 includes sensor elements 321 and 322. The sensor element 321 outputs angle information SGN_2A which is a sine signal to the microcomputer 51. The sensor element 322 outputs angle information SGN_2B which is a cosine signal to the microcomputer 51. The third sensor unit 330 includes sensor elements 331 and 332. The sensor element 331 outputs angle information SGN_3A which is a sine signal to the microcomputer 51. The sensor element 332 outputs angle information SGN_3B which is a cosine signal to the microcomputer 51. In the third embodiment, the rotation angle sensor 300 outputs each angle information to the microcomputer 51 as an analog signal.

In addition to the configuration of the microcomputer 50 of the first embodiment, the microcomputer 51 has A/D converters 551 to 556 which convert digitally the angle information outputted from the rotation angle sensor 300. The A/D converter 551 digitally converts the angle information SGN_1A. The A/D converter 552 digitally converts the angle information SGN-1B. The A/D converter 553 digitally converts the angle information SGN_2A. The A/D converter 554 digitally converts the angle information SGN-2B. The A/D converter 555 digitally converts the angle information SGN_3A. The A/D converter 556 digitally converts the angle information SGN-3B. The angle information converted into digital signals by the A/D converters 551 to 555 are outputted to the rotation angle calculation unit 55 and the abnormality monitor unit 56 (not shown in FIG. 12). Hereinafter, the angle information SGN_1A, SGN_1B, SGN_2A, SGN_2B, SGN_3A and SGN_3B are values after digital conversion. The A/D converters 551 to 556 are not shown in FIG. 13.

As shown in FIG. 13, the rotation angle calculation unit 55 calculates the electrical angle θ based on the angle information acquired from the rotation angle sensor 300. In the third embodiment, the electrical angle θ is calculated using angle information from two sensor units which are normal. When all the sensor units 310, 320 and 330 are normal, the rotation angle calculation unit 55 calculates the electrical angle θ based on the angle information of the first sensor unit 310 and the second sensor unit 320, for example.

The abnormality monitor unit 56 performs abnormality check based on the angle information acquired from the rotation angle sensor 300. The abnormality check processing is basically the same as in FIG. 6, but the abnormality monitor condition in S101 is different. Since the abnormality check processing for the sensor units 310, 320 and 330 are similar, the check processing for the first sensor 310 will be described as one example. When equations (3) and (4) for calculating deviations between its own angle information and the angle information of the other sensor units are both satisfied, it is determined that the angle information SGN_1A is abnormal according to the theory of majority and the abnormality monitor condition is satisfied. Further, when both equations (5) and (6) for calculating the deviation between its own angle information and the angle information of the other sensor units are satisfied, it is determined that the angle information SGN-1B is abnormal according to the theory of majority and the abnormality monitor condition is satisfied. Abnormality check threshold values THe2 in the equations (3) to (6) may be set to arbitrary values close to zero in consideration of the detection error or the like. Here, the same values are used in the equations (3) to (6), but they may be different.

$$|SGN\_1A - SGN\_2A| > THe2 \tag{3}$$

$$|SGN\_1A - SGN\_3A| > THe2 \tag{4}$$

$$|SGN\_1B - SGN\_2B| > THe2 \tag{5}$$

$$|SGN\_1B - SGN\_3B| > THe2 \tag{6}$$

When the angle information SGN_1A is larger than an upper limit value THhi or smaller than a lower limit value THlo, it is determined that the angle information SGN_1A is abnormal and the abnormality monitor condition is satisfied. Similarly, when the angle information SGN_1B is larger than the upper limit value or smaller than the lower limit value, it is determined that the angle information SGN_1B is abnormal and the abnormality monitor condition is satisfied.

When it is determined that the abnormality monitor condition is satisfied for each of the sensor units 310, 320 and 330, an abnormality check counter is incremented. When a count value of the abnormality check counter becomes larger than an abnormality finalization threshold value, the abnormality is finalized. When the count value of the abnormality check counter is equal to or smaller than the abnormality finalization threshold value, the abnormality is detected as continuing and need be monitored more.

Angle calculation processing executed by the microcomputer 51 in the third embodiment will be described below with reference to a flowchart shown in FIG. 14. In S531, the rotation angle calculation unit 55 checks whether the first sensor unit 310 is normal. When it is determined that the first sensor unit 310 is not normal (S531: NO), the rotation angle calculation unit 55 executes S539. When it is determined that the first sensor unit 310 is normal (S531: YES), the rotation angle calculation unit 55 executes S532.

In S532, the rotation angle calculation unit 55 checks whether the second sensor unit 320 is normal. When it is determined that the second sensor unit 230 is not normal (S532: NO), the rotation angle calculation unit 55 executes S536. When it is determined that the second sensor unit 230 is normal (S532: YES), the rotation angle calculation unit 55 executes S533.

In S533, the rotation angle calculation unit 55 checks whether the third sensor unit 330 is normal. When it is determined that the third sensor unit 330 is normal (S533: YES), the rotation angle calculation unit 55 executes S535. When it is determined that the third sensor unit 530 is not normal (S533: NO), the rotation angle calculation unit 55 executes S534.

In S534, the rotation angle calculation unit 55 checks whether the third sensor unit 330 is finally determined to be abnormal. When it is determined that the third sensor unit 130 is not finalized to be abnormal (S534: NO), that is, when the third sensor unit 130 is determined to be still under the monitor state and before the final determination of abnormality, the rotation angle calculation unit 55 executes S546. When it is determined that the abnormality of the third sensor unit 330 is finalized (S534: YES), the rotation angle calculation unit 55 executes S535.

In S535, the rotation angle calculation unit 55 calculates the electrical angle θ based on the angle information SGN_1A, SGN_1B of the first sensor unit 310 and the angle information SGN_2A, SGN_2B of the second sensor unit 320 as expressed by the following equation (7). In the third embodiment, the electrical angle θ is calculated as an arc tangent (ATAN) of the sine signal and the cosine signal. The calculated electrical angle θ is held as the hold value θhold.

$$\theta = ATAN\{(SGN\_1A + SGN\_2A)/(SGN\_1B + SGN\_2B)\} \tag{7}$$

In S536 which is executed when the check result of S532 is negative (NO), the rotation angle calculation unit 55 checks whether the second sensor unit 320 is finally determined to be abnormal. When it is determined that the abnormality of the second sensor unit 320 is not finalized (S536: NO), the rotation angle calculation unit 55 executes S546. When it is determined that the abnormality of the second sensor unit 320 is finalized (S536: YES), the rotation angle calculation unit 55 executes S537.

In S537, the rotation angle calculation unit 55 checks whether the third sensor unit 330 is normal. When it is determined that the third sensor unit 530 is not normal (S537: NO), the rotation angle calculation unit 55 executes S544. In S538, which is executed when the third sensor unit 330 is normal (S537: YES), the rotation angle calculation unit 55 calculates the electrical angle θ based on the angle information SGN_1A, SGN_1B of the first sensor unit 310 and the angle information SGN_3A, SGN_3B of the third sensor unit 330 as expressed by the following equation (8). The calculated electrical angle θ is held as the hold value θhold.

$$\theta = ATAN(SGN\_1A + SGN\_3A)/(SGN\_1B + SGN\_3B) \tag{8}$$

In S539 which is executed when the check result of S531 is negative, the rotation angle calculation unit 55 checks whether the first sensor unit 310 is finally determined to be abnormal. When it is determined that the abnormality of the first sensor unit 310 is not finalized (S539: NO), the rotation angle calculation unit 55 executes S546. When it is determined that the abnormality of the first sensor unit 310 is finalized (S539: YES), the rotation angle calculation unit 55 executes S540.

In S540, the rotation angle calculation unit 55 checks whether the second sensor unit 320 is normal. When it is determined that the second sensor unit 320 is not normal (S540: NO), the rotation angle calculation unit 55 executes S543. When it is determined that the second sensor unit 320 is normal (S540: YES), the rotation angle calculation unit 55 executes S541.

In S541, the rotation angle calculation unit 55 checks whether the third sensor unit 330 is normal. When it is determined that the third sensor unit 330 is not normal (S541: NO), the rotation angle calculation unit 55 executes S544. In S542, which is executed when the third sensor unit 330 is determined to be normal (S541: YES), the rotation angle calculation unit 55 calculates the electrical angle θ based on the angle information SGN_2A, SGN_2B of the second sensor unit 320 and the angle information SGN_3A, SGN_3B of the third sensor unit 330 as expressed by the following equation (9). The calculated electrical angle θ is held as the hold value θhold.

$$\theta = ATAN\{(SGN\_2A + SGN\_3A)/(SGN\_2B + SGN\_3B)\} \tag{9}$$

In S543 which is executed when the check result of S5440 is negative, the rotation angle calculation unit 55 checks whether the second sensor unit 320 is finally determined to be abnormal. When it is determined that the abnormality of the second sensor unit 320 is not finalized (S543: NO), the rotation angle calculation unit 55 executes S546. When it is determined that the abnormality of the second sensor unit 320 is finalized (S543: YES), the rotation angle calculation unit 55 executes S545.

In S544 which is executed when the check result of S537 or S541 is negative, the rotation angle calculation unit 55 checks whether the third sensor unit 330 is finally determined to be abnormal. When it is determined that the abnormality of the third sensor unit 330 is not finalized (S544: NO), the rotation angle calculation unit 55 executes S546. When it is determined that the abnormality of the third sensor unit 330 is finalized (S544: YES), the rotation angle calculation unit 55 executes S545.

In S545 which is executed when two of the first, second and third sensor units 310, 320 and 330 is finally determined to be abnormal, the rotation angle calculation unit 55 sets the electrical angle θ to the hold value θhold. In addition, the microcomputer 50 stops driving the motor 80 thereby stopping assisting the steering operation.

In S546 which is executed when any one of the first, second and third sensor units 310, 320 and 330 is detected to be abnormal but not yet finalized to be abnormal, the rotation angle calculation unit 55 sets the electrical angle θ used for the current supply control to the hold value θhold.

That is, in the third embodiment, if all of the first, second and third sensor units 310, 320 and 330 are normal, the electrical angle θ is calculated using the angle information SGN_1A, SGN_1B, SGN_2A, SGN_2B of the first sensor unit 310 and the second sensor unit 320 . When any one of the first, second and third sensor units 310, 320 and 330 is finally determined to be abnormal, the rotation angle calculation unit 55 calculates the electrical angle θ based on the angle information of the remaining two sensor units which are not abnormal.

When any one of the first, second and third sensor units 310, 320 and 330 is still under abnormality detection, that is, under the monitor state, the electrical angle θ is set to the hold value θhold. It is noted in the third embodiment and also the following fourth embodiment that, similarly to the second embodiment, the electrical angle θ may be corrected by the rotation angular velocity ω calculated based on the information of the sensor unit which is normal.

In the third embodiment, the first sensor unit 310 and the second sensor unit 320 are provided as the main sensor unit, and the third sensor unit 330 is provided as the auxiliary sensor unit. Even in case that the angle information outputted from the rotation angle sensor 300 is the analog signal, the third embodiment provides the similar advantage as in the first and second embodiments.

Fourth Embodiment

Figure 15:
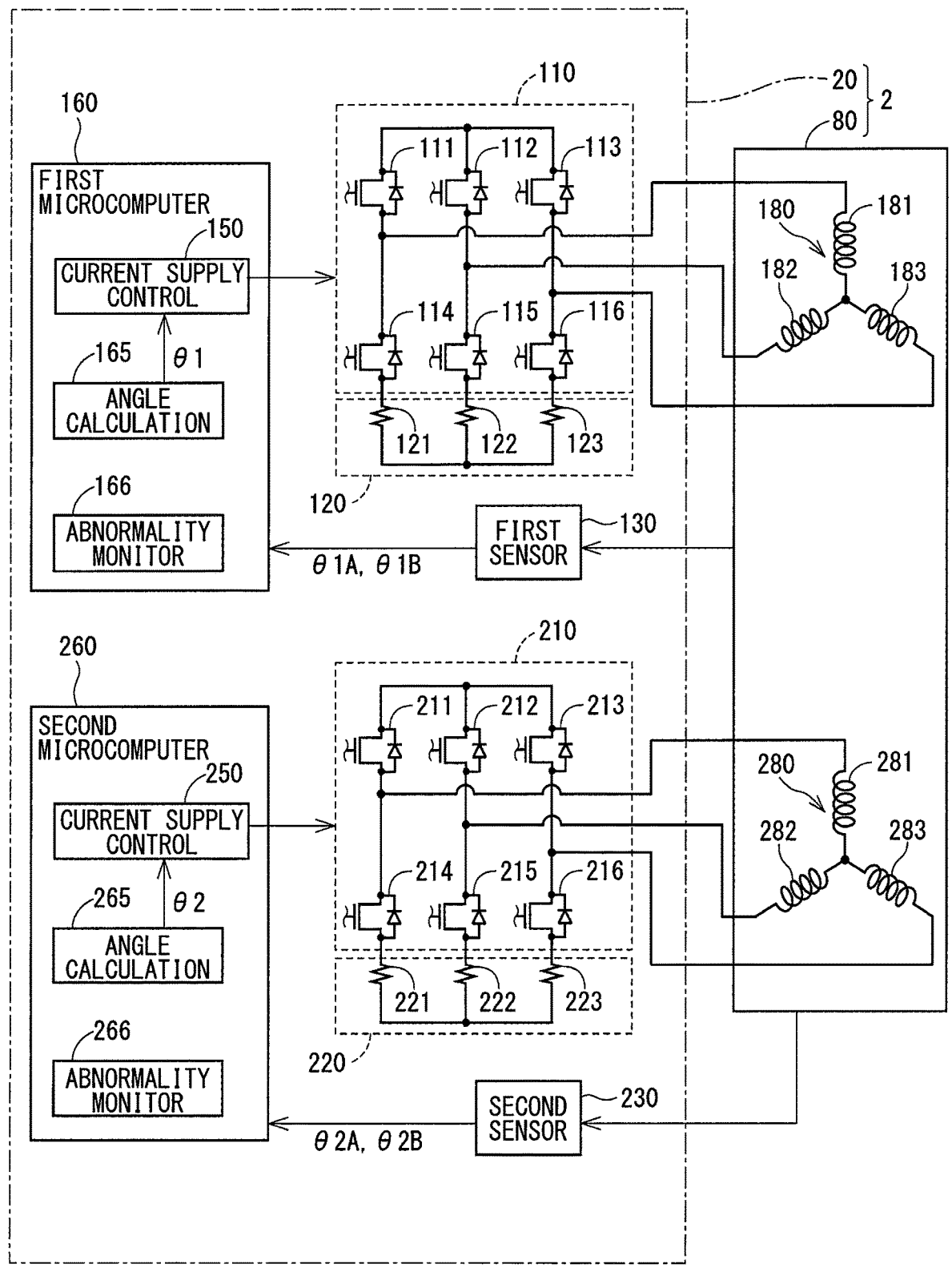
FIG. 15 is a circuit diagram showing an electric power steering apparatus according to a fourth embodiment.

An electric power steering apparatus 2 according to a fourth embodiment is shown in FIG. 15. The electric power steering apparatus 2 of the fourth embodiment is applied to the steering system 90 and includes a control unit 20 and the motor 80 similarly to the first embodiment. The control unit 20 differs from that of the first embodiment in that first and second microcomputers 160 and 260 are provided.

The first microcomputer 160 includes a current supply control unit 150, an angle calculation unit 165, an abnormality monitor unit 166 and the like. The first microcomputer 160 acquires the angle information θ1A and θ1B from the first sensor unit 130. The angle calculation unit 165 calculates the electrical angle θ1 based on the angle information θ1A. The current supply control unit 150 controls current supply to the first winding set 180 based on the electrical angle θ1. The abnormality monitor unit 166 monitors abnormality of the first sensor unit 130.

The second microcomputer 260 includes a current supply control unit 250, an angle calculation unit 265, an abnormality monitor unit 266 and the like. The second microcomputer 260 acquires the angle information θ2A and θ2B from the second sensor unit 230. The angle calculation unit 265 calculates the electrical angle θ2 based on the angle information θ2A. The current supply control unit 250 controls current supply to the second winding set 280 based on the electrical angle θ2. The abnormality monitor unit 266 monitors abnormality of the second sensor unit 230. Details of the current supply control and abnormality monitor are the same as those in the above-described embodiments.

In the fourth embodiment, the components related to the current supply control for the first and second winding sets 180 and 280, including the first and second microcomputers 160 and 260, are configured to be in "complete redundancy" for the first and second winding sets 180 and 280, respectively. In a normal state, the first microcomputer 160 and the second microcomputer 260 control the current supply by using the information of the first sensor unit 130 and the information of the second sensor unit 230, respectively.

Information relating to the abnormal state of the first and second sensor units 130 and 230 is shared between the first and second microcomputers 160 and 260, for example, via inter-microcomputer communication or the like. When an abnormality of the first sensor unit 130 is detected, the first microcomputer 160 notifies the second microcomputer 260 of information indicating that the first sensor unit 130 is abnormal. Similarly, when an abnormality of the second sensor unit 230 is detected, the second microcomputer 260 notifies the first microcomputer 160 of information indicating that the second sensor unit 230 is abnormal.

In processing of the first microcomputer 160, the first microcomputer 160 performs the current supply control based on the electrical angle θ1 corresponding to the angle information θ1A when the first sensor unit 130 is normal (S501: YES) without executing S502 and S503 shown in FIG. 7. When the abnormality of the first sensor unit 130 is being detected but not finalized yet (S501: NO, S505: NO), the value at the normal time is held and the current supply control is continued using the hold value (S510). When the abnormality of the first sensor unit 130 is finalized (S505: YES), the assisting the steering operation in the first system is stopped and the assisting the steering operation in the second system is performed using the electrical angle value of the second sensor unit 230 (S508). That is, the control mode is switched over to a single-system driving mode.

The processing of the second microcomputer 260 is similar to that of the first microcomputer 160. For example, in case of the second microcomputer 260, S502 and S503 in FIG. 7 are not executed and the first sensor unit 130 may be replaced with the second sensor unit 230. Specifically, the second microcomputer 260 performs the current supply control based on the electrical angle θ2 corresponding to the angle information θ2A when the second sensor unit 230 is normal (S501: YES). When the abnormality of the second sensor unit 130 is being detected but not finalized yet (S501: NO, S505: NO), the electrical angle value at the normal time is held and the current supply control is continued using the hold value (S510). When the abnormality of the second sensor unit 230 is finalized (S505: YES), the assisting the steering operation in the second system is stopped and the assisting the steering operation in the first system is performed using the electrical angle value of the first sensor unit 130 (S508). That is, the control mode is switched over to the single-system driving mode.

When a negative determination is made in S507, S508 is executed. When an affirmative determination is made, that is, when both first and second sensor units 130 and 230 are finally determined to be abnormal, the assisting the steering operation is stopped (S509).

It is to be noted that continuing the single-system drive in the normal system in case of the final abnormality determination is one example of switching over to the rotation angle calculation based on the angle information of the normal sensor unit when the abnormality of the sensor unit is finalized. In place of switching over to the single-system drive mode, it is also possible to continue the control by the first microcomputer 160 and the second microcomputer 260 by acquiring the normal angle information or electrical angle θ from the normal system operating normally through the inter-microcomputer communication or the like. In the fourth embodiment, the first and second microcomputers 160 and 260 are provided as a control unit.

In the fourth embodiment, the angle information θ1A, θ1B, θ2A, θ2B, which are digital signals, are inputted to the microcomputers 160 and 260 as in the first embodiment. However, the angle information may be inputted as the analog signals as in the third embodiment.

As described above, the electric power steering apparatus 2 of the fourth embodiment assists the steering operation of the driver by controlling the driving of the motor 80 having the first and second winding sets 180 and 280 and includes the first and second inverters 110 and 210, the rotation angle sensor 30 and the first and second microcomputers 160 and 260. The first inverter 110 switches over the current supply to the first winding set 180 and the second inverter 210 switches over the current supply to the second winding set 280. The rotation angle sensor 30 includes the first and second sensor units 130 and 230 which detect signals varying with the rotation of the motor 80 and output the angle information.

The first microcomputer 160 includes the abnormality monitoring unit 166 for monitoring the abnormality of the corresponding first sensor unit 130, the rotation angle calculation unit 165 for calculating the electrical angle θ1 based on the angle information acquired from the first sensor unit 130 and the abnormality state of the first sensor unit 130, and the current supply control unit 150 for controlling the first inverter 110 based on the electrical angle θ. The second microcomputer 260 includes the abnormality monitoring unit 266 for monitoring the abnormality of the corresponding second sensor unit 230, the rotation angle calculation unit 265 for calculating the electrical angle θ2 based on the angle information acquired from the second sensor unit 230 and the abnormality state of the second sensor unit 230, and the current supply control unit 250 for controlling the second inverter 210 based on the electrical angle θ.

The inverters 120, 210, the sensor units 130, 230 and the microcomputers 160, 260 are provided in correspondence to the winding sets 180, 280, respectively. That is, the first inverter 120, the first sensor unit 130 and the first microcomputer 160 are provided for the first winding set 180. The second inverter 210, the second sensor unit 230 and the second microcomputer 260 are provided for the second winding set 280.

When the abnormality of the first sensor unit 130 is detected, the rotation angle calculation unit 165 calculates the electrical angle θ1 based on the hold value θhold which is the electrical angle θ before the abnormality detection during a period of the monitor state which is from the start of the abnormality detection to the final determination of the abnormality. When the abnormality of the first sensor unit 130 is finalized, the current supply is controlled by the second microcomputer 260 provided in correspondence to the second sensor unit 230 which is normal.

When the abnormality of the second sensor unit 230 is detected, the rotation angle calculation unit 265 calculates the electrical angle θ2 based on the hold value θhold which is the electrical angle θ before the abnormality detection during a period of the monitor state which is from the start of the abnormality detection to the final determination of the abnormality. When the abnormality of the second sensor unit 130 is finalized, the current supply is controlled by the first microcomputer 160 provided in correspondence to the first sensor unit 130 which is normal.

By providing the first and second microcomputers 160 and 260, even if one of the microcomputers becomes abnormal, the other microcomputer can be used to drive the motor 80 by one-system drive and continue assisting the steering operation. The fourth embodiment also provides the similar advantages as in the foregoing embodiments.

Other Embodiment

In the second embodiment, during the abnormality detection, the hold value is corrected based on the rotation angular velocity. As another embodiment, the angle correction in the abnormal detection value may be performed such that the hold value is corrected when the rotation angular velocity is within a predetermined range. In this modification, the angle correction is not performed when the rotation angular velocity is not within the predetermined range. As a result, it is possible to prevent the rotational angle from being controlled inappropriately because of the correction by the rotation angular velocity when the rotation angular velocity is too large or the motor is almost stopped.

As another embodiment, in order to avoid frequent detections of abnormality due to noise or the like, a check threshold value for detecting an abnormality from the normal state where the angle information is normal and a check threshold value for detecting a return from the abnormal state to the normal state may be made different from each other. In addition, in order to avoid unintended frequent switching of the sensor unit, a margin may be provided so that the same state continues for at least a certain period when the sensor unit used for calculation of the rotation angle is switched over.

In the first embodiment, the sensor unit is provided with a self-diagnosis unit. As another embodiment, the self-diagnosis unit in the sensor unit may be omitted. In this case, it is desirable to perform in the control unit side the same diagnosis as the self-diagnosis unit performed in the sensor unit.

In the embodiments described above, it is exemplified to use the angle information θ2A when the angle information θ1A is finally determined to be abnormal. As another embodiment, the angle information θ2B may be used when the angle information θ1B is finally determined to be abnormal.

In the embodiments described above, the motor is provided with two winding sets. As another embodiment, the number of winding sets may be one, three or more. The number of the control units may be one or plural. Further, in the embodiments described above, two or three sensor units are provided in the rotation angle sensor. As another embodiment, the number of the sensor units may be four or more. The present disclosure is not limited to the embodiments described above, and various modifications may be made further.

What is claimed is:

1. An electric power steering apparatus for assisting a steering operation in a vehicle by controlling driving of a motor having a winding set, the electric power steering apparatus comprising:
    an inverter for switching over current supply to the winding set;
    a rotation angle sensor including plural sensor units which detect signals varying with a rotation of the motor and outputting rotation angle information; and
    a control unit for monitor an abnormality of the rotation angle sensor, calculating a rotation angle of the motor based on the rotation angle information acquired from the rotation angle sensor and an abnormality state of the rotation angle sensor, and controlling the inverter based on the rotation angle, wherein:
    the control unit is connected to the inverter and the rotation angle sensor and programmed to calculate, when an abnormality of a part of the sensor units is detected, the rotation angle of the motor based on a hold value, which is the rotation angle calculated before a detection of abnormality of the part of the sensor units, during a period from the detection of abnormality to a final determination of abnormality of the part of the sensor units;
    the control unit is programmed to switch over to calculate the rotation angle of the motor based on the rotation angle information of a sensor unit that is normal, when the abnormality of the part of the sensor units is finalized; and
    the control unit is programmed to calculate the rotation angle of the motor by correcting the hold value by a rotation angular velocity of the motor calculated based on the rotation angle information of the sensor unit that is normal.

2. The electric power steering apparatus according to claim 1, wherein:
    the plural sensor units include a main sensor unit and an auxiliary sensor unit;
    the control unit is programmed to calculate the rotation angle of the motor based on the rotation angle information of the main sensor unit when the main sensor unit is normal;
    the control unit is programmed to calculate the rotation angle of the motor based on the hold value during the period from the detection of abnormality to a final determination of abnormality of the main sensor unit; and
    the control unit is programmed to switch over to calculate the rotation angle of the motor based on the rotation angle information of the auxiliary sensor unit after the final determination of abnormality of the main sensor unit.

3. The electric power steering apparatus according to claim 2, wherein:
    the control unit is programmed to calculate the rotation angle of the motor based on the hold value during the period from the detection of abnormality to a final determination of the auxiliary sensor unit; and
    the control unit is programmed to switch over to calculate the rotation angle of the motor based on the rotation angle information of the main sensor unit after the final determination of abnormality of the auxiliary sensor unit.

4. The electric power steering apparatus according to claim 2, wherein:
    the control unit is programmed to continue calculation of the rotation angle of the motor based on the rotation angle information of the main sensor unit when the abnormality of the auxiliary sensor unit is detected.

5. An electric power steering apparatus for assisting a steering operation in a vehicle by controlling driving of a motor having plural winding sets, the electric power steering apparatus comprising:
    plural inverters for switching over power supply to the plural winding sets;
    a rotation angle sensor including plural sensor units which detect signals varying with a rotation of the motor and outputting rotation angle information;
    plural control units each including an abnormality monitor unit for monitoring an abnormality of the rotation angle sensor, a rotation angle calculation unit for calculating a rotation angle of the motor based on the rotation angle information acquired from the rotation angle sensor and an abnormality state of the rotation angle sensor, and a current supply control unit for controlling inverter based on the rotation angle, wherein:
    an inverter, a sensor unit and a control unit are provided for each of the plural winding sets;
    the control unit is programmed to calculate the rotation angle of the motor based on a hold value, which is the rotation angle calculated before a detection of abnormality, during a period from the detection of abnormality to a final determination of abnormality, when an abnormality of a corresponding one of the sensor units is detected;
    the control unit is programmed to continue control corresponding to a sensor unit, that is normal, when the abnormality of the corresponding one of the sensor units is detected; and
    the control unit is programmed to calculate the rotation angle of the motor by correcting the hold value by a rotation angular velocity of the motor calculated based on the rotation angle information of the sensor unit that is normal.

6. An electric power steering apparatus for assisting a steering operation in a vehicle by controlling driving of a motor having a winding set, the electric power steering apparatus comprising:
    an inverter for switching over current supply to the winding set;
    a rotation angle sensor including plural sensor units which detect signals varying with a rotation of the motor and outputting rotation angle information; and
    a control unit including an abnormality monitor unit for monitoring an abnormality of the rotation angle sensor, a rotation angle calculation unit for calculating a rotation angle of the motor based on the rotation angle information acquired from the rotation angle sensor and an abnormality state of the rotation angle sensor, and a current supply control unit for controlling the inverter based on the rotation angle, wherein:
    the rotation angle calculation unit calculates, when an abnormality of a part of the sensor units is detected, the rotation angle of the motor based on a hold value, which is the rotation angle calculated before a detection of abnormality of the part of the sensor units, during a period from the detection of abnormality to a final determination of abnormality of the part of the sensor units;
    the rotation angle calculation unit switches over to calculate the rotation angle of the motor based on the rotation angle information of a sensor unit that is normal, when the abnormality of the part of the sensor units is finalized; and the control unit is programmed to calculate the rotation angle of the motor by correcting the hold value by a rotation angular velocity of the motor calculated based on the rotation angle information of the sensor unit that is normal.

* * * * *